(12) United States Patent  
Morita et al.

(10) Patent No.: US 6,439,875 B1  
(45) Date of Patent: Aug. 27, 2002

(54) MOLD CLAMPING APPARATUS AND METHOD OF CONTROLLING OPERATION OF THE APPARATUS

(75) Inventors: Ryozo Morita; Ryoji Takashi, both of Nagoya; Satoshi Tomita, Okazaki; Takashi Shinoda, Aichi-gun; Keijiro Oka, Nagoya, all of (JP)

(73) Assignee: Kabushiki Kaisya Meiki Seisakusyo, Obu (JP)

( * ) Notice: Subject to any disclaimer, the term of this patent is extended or adjusted under 35 U.S.C. 154(b) by 0 days.

(21) Appl. No.: 09/568,696

(22) Filed: May 11, 2000

(30) Foreign Application Priority Data

May 20, 1999 (JP) .............................. 11-139809  
Apr. 3, 2000 (JP) ...................... 2000-101620

(51) Int. Cl.⁷ .............................................. B29C 45/64
(52) U.S. Cl. ..................... 425/556; 264/39; 264/40.5; 425/590; 425/595
(58) Field of Search ................ 264/39, 40.5, 328.1; 425/556, 589, 590, 595

(56) References Cited

U.S. PATENT DOCUMENTS 5,261,810 A * 11/1993 Kamp et al. ................. 425/590  
5,345,766 A    9/1994 Leonhartsberger et al.  
6,093,361 A    7/2000 Schad  
6,200,123 B1 * 3/2001 Mailliet et al. ............. 425/595

FOREIGN PATENT DOCUMENTS

| JP | A-61-237617 | 10/1986 |
| JP | B2 1-49097 | 10/1989 |
| JP | A-3-3389 | 1/1991 |
| JP | A-6-504356 | 5/1994 |
| JP | A 7-132517 | 5/1995 |
| JP | B2 8-13490 | 2/1996 |
| JP | B2 2604271 | 1/1997 |
| JP | A 10-113957 | 5/1998 |
| JP | A 10-258432 | 9/1998 |
| JP | A 11-291311 | 10/1999 |
| JP | A 2000-301580 | 10/2000 |

* cited by examiner

*Primary Examiner*—James P. Mackey  
(74) *Attorney, Agent, or Firm*—Oliff & Berridge, PLC

(57) ABSTRACT

Mold clamping apparatus is disclosed which includes: an electrically-operated movable-platen-driving device of ball-screw type having a first ball-screw shaft supported by one of a movable and a rear platens, a first ball-nut threaded-engaged with the first ball-screw shaft and supported by the other of the movable and rear platens, and a movable-platen driving device for rotating the first ball-screw shaft and nut relative to each other so as to generate a relative longitudinal motion of the first ball-screw shaft and nut so that said movable platen is moved toward and away from a stationary platen to close and open the mold; a pressure-generating cylinder device having a pressure-generating piston moved by the relative longitudinal motion of the first ball-screw shaft and nut in order to generate a hydraulic pressure; and a mold clamping cylinder device adapted to generate a mold clamping force based on the hydraulic pressure applied from the pressure-generating cylinder device; and an engaging device which is operable for connecting a mold clamping ram of the mold clamping cylinder device with the movable platen, for applying the mold clamping force to the movable platen. The method of controlling operation of the apparatus is also disclosed.

29 Claims, 10 Drawing Sheets

MOLD CLAMPING APPARATUS AND METHOD OF CONTROLLING OPERATION OF THE APPARATUS

BACKGROUND OF THE INVENTION

1. Field of the Invention

The present invention relates generally to mold clamping apparatus of an injection molding machine which includes a driving device having a ball-screw driven by an electric motor by which a movable platen is reciprocally moved toward and away from a stationary platen, whereby a mold is accordingly closed and opened. More particularly, the present invention is concerned with a mold clamping apparatus having a novel structure wherein a hydraulic cylinder-piston mechanism is utilized to obtain an increased mold clamping force, and an effective method for controlling operation of the mold clamping apparatus.

2. Description of the Related Art

As a device for clamping a mold used for an injection molding machine, for example, there are known a direct-pressure type mold clamping device having a hydraulic cylinder-piston mechanism which generate a driving force directly applied to a movable platen so as to move the movable platen toward and away from a stationary platen for opening and closing the mold defined therebetween and so as to force the movable platen to the stationary platen for clamping the mold therebetween, and a toggle-type clamping device having a link mechanism in which the driving force is applied to the movable platen via the link mechanism. Another type of mold clamping device is also known, that device includes a ball-screw and an electric motor. In this ball-screw type clamping device, a rotational driving force of the electric motor is converted into a reciprocal driving force by the ball-screw, thereby executing the above-indicated mold opening and closing and clamping action, by utilizing this reciprocal driving force.

In the mold opening and closing actions, such a mold clamping device as described above is required to move the movable platen at a relatively-high velocity, in order to shorten a cycle time of a forming operation of the injection molding machine. In the mold clamping action, on the other hand, the mold clamping device is required to apply a relatively large driving force to the movable platen so that the movable platen is forced toward the stationary platen with a sufficiently large mold clamping force, thereby assuring a high accuracy of the injection molding. However, the conventional mold clamping device using the ball-screw suffers from difficulty in meeting both of these requirements.

The present inventor has been proposed in JP-U-3-3389 (publication number 3-3389 of Japanese Utility model application) a mold clamping device having an electric motor and a ball-screw, as well as a hydraulic cylinder-piston mechanism. This mold clamping device further includes an accumulator for accumulating a pressurized fluid, and is arranged such that the movable platen is moved by using the ball-screw for opening and closing the mold and is forced toward the stationary plate for clamping the mold therebetween by means of the hydraulic cylinder-piston mechanism and by utilizing the pressurized fluid accumulated in the accumulator during opening and closing the mold by using the ball-screw. This mold clamping device makes it possible to meet both of the above-indicated requirements. Namely, the proposed mold clamping device permits the mold opening and closing operation at a relatively-high velocity by using a combination of the electric motor and a small-sized ball-screw, and assures the generation of the relatively large mold clamping force with ease by utilizing the hydraulic cylinder-piston mechanism.

However, the proposed mold clamping device utilizes the pressurized fluid previously accumulated in the accumulator and then applied to a cylinder chamber of the cylinder-piston mechanism via a suitable switch valve. This requires the switching operation of the switch valve under a given hydraulic pressure generated by the pressurized fluid, needing a relatively large-sized switch valve and a relatively-large driving force for driving the large-sized switch valve, resulting in a time-consumed switching operation of the switch valve. In addition, the proposed mold clamping device suffers from a problem of pressure losses of the pressurized fluid during accumulated in the accumulator. Therefore, the proposed mold clamping device possibly suffers from insufficiency of the required characteristics.

SUMMARY OF THE INVENTION

It is therefore a first object of the present invention to provide an improved mold clamping apparatus which is capable of generating a desired driving force with ease by means of an electric motor and a ball-screw, for assuring a reciprocal movement of a movable platen at a relatively-high velocity, and generating a relatively-large mold clamping force with ease by using a hydraulic device.

It is a second object of the present invention to provide a suitable method for controlling an operation of such a mold clamping device.

The first object of the present invention may be achieved according to a first aspect of this invention, which provides a mold clamping apparatus of an injection-molding machine for clamping a mold consisting of a stationary mold half and a movable mold half, said mold clamping apparatus comprising: (a) a stationary platens fixedly disposed on a base of the injection-molding machine and being fixed with the stationary mold half; (b) a rear platen fixedly disposed on the base of the injection-molding machine and being opposite to and spaced apart from the stationary platen and; (c) a movable platen movably disposed between the stationary and rear platens and being fixed with the movable mold half; (d) an electrically-operated movable-platen-driving device of ball-screw type, including a first ball-screw shaft supported by one of the movable and rear platens, a first ball-nut threaded-engaged with the first ball-screw shaft and supported by the other of the movable and rear platens, and a movable-platen-driving-electric motor adapted to rotate the first ball-screw shaft and nut relative to each other so as to generate a relative longitudinal motion of the first ball-screw shaft and nut so that the movable platen is moved toward and away from the stationary platen to close and open the mold; (e) a pressure-generating cylinder device disposed on the rear platen and having a pressure-generating piston being moved by the relative longitudinal motion of the first ball-screw shaft and nut in order to generate a hydraulic pressure; (f) a mold clamping cylinder device disposed on the rear platen and adapted to generate a mold clamping force based on the hydraulic pressure generated in and applied from the pressure-generating cylinder device, the mold clamping cylinder device having a mold clamping ram which is connectable to the movable platen for applying the mold clamping force to the movable platen; and (g) an engaging device having a first operating position for connecting the mold clamping ram with the movable platen, and a second operating position for disconnecting the mold clamping ram from the movable platen, the mold clamping apparatus clamping the mold such that the movable platen is moved toward the stationary platen to close the mold therebetween, and the pressure-generating cylinder is operated to generate the hydraulic pressure, based on the relative longitudinal motion of the first ball-screw shaft and nut, while the engaging device is placed in the first operating position in order to apply the mold clamping force generated in the mold clamping cylinder device to the movable platen.

In the mold clamping apparatus constructed according to the first aspect of the present invention, the mold opening and closing operation is performed such that the ball-screw type movable-platen-driving device is used for reciprocally moving the movable platen between a mold opening position and a mold closing position of the movable platen. Namely, the first ball-screw shaft and the first ball-nut of the movable-platen-driving device are rotated relative to each other by the movable-platen-driving-electric motor of the movable-platen-driving device. This ball-screw mechanism is used to convert the relative rotation of the first ball-screw shaft and nut into the relative longitudinal motion or a relative displacement of the first ball-screw shaft and nut in the axial direction. The movable platen is directly moved by the longitudinal motion of the ball-screw shaft and nut in a direction toward and away from the stationary platen, for thereby opening and closing the mold. On the other hand, a mold clamping operation and a hydraulic pressure decreasing operation are performed by using the pressure-generating and the mold clamping cylinder devices, in addition to the movable-platen-driving device. Namely, the first ball-screw shaft and the ball-nut of the movable-platen-driving device are rotated relative to each other by the movable-platen-driving-electric motor, for converting the relative rotation of the ball-screw shaft and nut into the relative longitudinal motion of the ball-screw shaft and nut in the axial direction. The pressure-generating cylinder device is operated by the longitudinal motion of the first ball-screw shaft and nut for generating a hydraulic pressure therein. The hydraulic pressure generated in the pressure-generating cylinder device is applied to the mold clamping cylinder device so that the mold clamping cylinder device generates increased hydraulic pressure-generating the mold clamping force applied to the movable platen. Therefore, the movable platen is forced to stationary platen with the mold clamping force, resulting in clamping the mold between the movable and stationary platens.

In the thus constructed mold clamping apparatus, only the movable-platen-driving-electric motor is used as a power source, that is, generates a driving-force by its rotation. In the mold opening and closing action, the rotational driving-force of the electric motor is directly applied to the movable platen by means of the ball-screw device consisting of the ball-screw shaft and the ball-nut of the movable-platen-driving device. That is, the ball-screw device and the electric motor constitute a mechanical driving-force transmitting system for the mold opening and closing action. In the mold clamping action, on the other hand, the driving-force of the electric motor is transmitted to the movable platen, via a hydraulic device comprising the pressure-generating and the mold clamping cylinder devices. That is, the pressure-generating and mold clamping cylinder devices constitute a hydraulic driving-force transmitting system for the mold clamping action. In order to obtain a sufficiently large mold clamping force in the mold clamping action, the driving force of the electric motor is not directly applied to the movable platen by means of the ball-screw device, but is enlarged by and applied through the hydraulic device.

The mold clamping apparatus of the present invention constructed as described above does not require a large-sized or a high-power ball-screw device, even in the case where a relatively-large mold clamping force is required. Therefore, the mold clamping apparatus is capable of meeting the requirements for the rapid mold opening and closing action by means of the ball-screw device, and for assuring a sufficiently large mold clamping force by means of the small-sized ball-screw device.

In the mold clamping operation, the present mold clamping apparatus is operated such that the pressure-generating cylinder device is operated by the ball-screw device to generate the hydraulic pressure force. The hydraulic pressure force generated in the pressure-generating cylinder device is promptly delivered to the mold clamping cylinder device for thereby generating an increased hydraulic pressure force which is applied to the movable platen as the mold clamping force. Since the mold clamping force is generated by the thus constructed hydraulic device and directly applied to the movable platen, without being stored in a suitable accumulator, the mold clamping apparatus according to the first aspect of the present invention facilitates a control of the mold clamping force and is less likely to suffer from a problem of pressure loss of the working fluid in comparison with the conventional mold clamping apparatus using the above mentioned accumulator.

When the mold clamping apparatus changes its operation from the mold opening and closing operation to the mold clamping operation, and vice versa, a hydraulic circuit disposed between the pressure-generating cylinder device and the mold clamping cylinder device may be changed. In this case, the hydraulic circuit can be changed under a relatively low hydraulic pressure applied thereto, owing to the above-indicated elimination of the conventionally required accumulator, for example. This permits an easy and rapid changing of the hydraulic circuit. Thus, the mold clamping apparatus constructed according to the first aspect of the present invention assures a smooth shift from the mold opening and closing operation to the mold clamping operation.

In addition, the mold clamping apparatus constructed according to the first aspect of the present invention enjoys an advantage that the mold clamping force can be easily and precisely recognized by detecting hydraulic pressure forces in the pressure-generating and mold clamping cylinder devices with a suitable pressure sensor, for example.

It is noted that the pressure-generating and mold clamping cylinder devices may be either integrally formed with the rear platen, or alternatively independent of and fixed to the rear platen.

According to one preferred form of the first aspect of the present invention, the pressure-generating cylinder device further includes a biasing device adapted to bias a pressure-generating piston toward a fully retracted position thereof to increase a volume of a pressure-generating chamber of the pressure-generating cylinder device.

In this preferred form of the mold clamping apparatus, the provision of the biasing device permits an easy definition of an initial position of the pressure-generating piston, resulting in an easy and stable control of the operation of the pressure-generating cylinder device. In this respect, the biasing device is arranged to have a desired biasing force that is resistive to the driving force of the movable-platen-driving device that is applied to the biasing device during the mold closing action. The biasing device may function based on its suitably arranged biasing force to prevent a transmission of the driving force of the movable-platen-driving device to the pressure-generating cylinder device during the mold closing action, for prohibiting the operation of the pressure-generating cylinder device, and to allow the operation of the pressure-generating cylinder device, after the completion of the mold closing operation at which the driving force of the movable-platen-driving device, which is larger than the biasing force of the biasing device, is applied to the pressure-generating piston.

According to another preferred from of the first aspect of the present invention, the pressure-generating cylinder device further includes a lock device which is operable to fixedly connect the pressure-generating piston to a pressure-generating cylinder of the pressure-generating cylinder device, so as to prevent a movement of the pressure-generating piston relative to the pressure-generating cylinder.

In this preferred form of the mold clamping apparatus, the pressure-generating piston of the pressure-generating cylinder can be fixedly held in the predetermined initial position thereof, by means of the lock device, facilitating a control of the mold opening and closing positions of the movable-platen. Since the motion of the pressure-generating cylinder device can be stably prohibited by the lock device during the mold closing action, the mold closing operation can be stably operated by the movable-platen-driving device, without adverse influence of an unexpected operation of the pressure-generating piston during the rapid mold closing action. It should be noted that the lock device is releasable in the mold clamping action, so that the mold clamping apparatus can smoothly shifts its operation modes from the mold closing operation to the mold clamping operation.

According to a further preferred form of the first aspect of the present invention, the mold clamping device further includes a hydraulic device having a hydraulic circuit for fluid communication between a pressure-generating chamber of the pressure-generating cylinder device and a mold clamping chamber of the mold clamping cylinder device, and having a switch valve alternately connecting and disconnecting the pressure-generating chamber to and from the mold clamping chamber.

In this preferred form of the first aspect of the present invention, the mold clamping or mold closing operations of the mold clamping apparatus can be controlled by controlling the switching operation of the switch valve in order to allow and prohibit the fluid communication between the pressure-generating and mold clamping chambers. For instance, the switch valve is closed to prohibit the fluid communication between the pressure-generating and mold clamping chambers in the mold closing action for disabling the pressure-generating cylinder device, thereby stabilizing the mold closing action.

According to still further preferred form of the first aspect of the present invention, the pressure-generating piston is a hollow cylindrical member, and the pressure-generating chamber is partially defined by an outer circumferential surface of the hollow pressure-generating piston. The first ball-screw shaft is located in and extends through a bore of the hollow pressure-generating piston, and the first ball-nut is fixed to the hollow pressure-generating piston.

In this preferred form of the first aspect of the present invention, the pressure-generating piston is the hollow cylindrical member, making it possible to effectively arrange the first ball-screw shaft and nut by utilizing an interior space of the bore of the hollow cylindrical pressure-generating piston, leading to reduction in size of the mold clamping apparatus.

According to yet further preferred form of the first aspect of the present invention, the mold clamping cylinder device is disposed such that a center axis of the mold clamping cylinder device is aligned with a center axis of the movable platen, and the mold clamping ram comprises a hollow cylindrical member. The mold claming apparatus further comprising: a mechanical ram which is fixed at one of axially opposite ends thereof to the movable platen and partially located in a bore of the hollow mold clamping ram, the engaging device being operable to hold the hollow mold clamping ram in engagement with the mechanical ram.

In the above indicated preferred form of the first aspect of the present invention, the mold clamping force generated by the mold clamping cylinder device can be applied to a center portion of the movable platen, effectively preventing an undesirable attitude of the movable platen, even in the case where the only one mold clamping cylinder device is used. Thus, the mold clamping apparatus of this preferred form assures a stable attitude of the movable platen during the mold clamping operation.

In the above preferred form of the first aspect of the present invention may preferably be modified such the engaging device comprises a plurality of first engageable protrusions formed on an outer circumferential surface of the mechanical ram such that the first engageable protrusions extend in a circumferential direction of the mechanical ram and are spaced apart from each other at regular intervals in an axial direction of the mechanical ram, and an engaging member having a plurality of second engageable protrusions and supported by the mold clamping ram such that said engaging member is immovable in an axial direction of the mechanical ram and is movable toward and away from the outer circumferential surface of the mechanical ram, for engaging and disengaging said second engageable protrusions with and from said first engageable protrusions.

In this preferred form of the first aspect of the present invention, an engaging position of the second engageable protrusions relative to the first engageable protrusions can be optionally changed in the axial direction of the mechanical ram, namely in the direction of the reciprocal motion of the movable platen, so that the first and second engageable protrusions fully engaged with each other. This means that the mold clamping apparatus is applicable to various kinds of molds having different values of thickness, by only changing the engaging position of the first and second engageable protrusions in the axial direction taken into account the thickness of the employed mold.

In the above preferred form of the first aspect of the present invention may preferably comprises an positioning electric motor adapted to move the engaging member relative to the mechanical ram in the axial direction of the mechanical ram so that the second engageable protrusions of the engaging member is suitably positioned for an engagement with the first engageable protrusions of the mechanical ram.

This arrangement facilitates positioning of the first and second engageable protrusions relative to each other in the axial direction of the mechanical ram, in which direction the movable platen is reciprocally movable. Preferably, the positioning electric motor may be a servomotor, so that the first engageable protrusions and the second engageable protrusions are positioned relative to each other with high preciseness.

In the above preferred forms of the first aspect of the present invention may preferably be modified such that the mechanical ram comprises a hollow cylindrical member, and the mold clamping apparatus further comprises: an electrically-operated ejector device of ball-screw type having an ejector fixed to the movable platen, a second ball-screw shaft located in a bore of the hollow mechanical ram and fixed to one of the mechanical ram and the ejector, an second ball-nut threaded-engaged with the second ball-screw shaft and fixed to the other of the mechanical ram and the ejector; and an ejecting electric motor adapted to rotate the second ball-screw shaft and nut relative to each other so as to generate a relative longitudinal motion of the second ball-screw shaft and nut, thereby driving the ejector.

In the above-preferred form of the first aspect of the present invention, the ejector device is electrified. Further, the ejector device can be installed within the bore of the mechanical ram with improved spaced utilization, resulting in a small-sized electrically operated ejector device. Moreover the second ball-screw shaft and nut, which is adapted to apply the driving force to the ejector, can be disposed such that the center axis of the second ball-screw shaft is aligned with the center axis of the movable platen. This arrangement is effective to prevent undesirable inclination of the ejector due to an unbalanced application of the driving force to the ejector, for example, resulting in a stable attitude and operation of the ejector during the ejecting operation.

Preferably, the ejecting electric motor is fixedly disposed within the bore of the hollow mechanical ram, and the hollow mechanical ram has an air flow passage extending through the bore thereof.

In this arrangement, an interior space of the bore of the mechanical ram is efficiently utilized so that the ejecting electric motor is disposed within the bore of the mechanical ram. In this case, the electric motor may be elongated along the axial direction of the mechanical ram, resulting in an increase in power of the ejecting electric motor, without an increase in the size of the mold clamping apparatus. In addition, the air passage permits ventilation of the interior space of the bore of the mechanical ram, owing to the axially reciprocal movement of the mechanical ram, effectively eliminating a problem of heat generated by the ejector electric motor.

According to yet another preferred form of the first aspect of the present invention, the pressure-generating cylinder device comprises a plurality of pressure-generating cylinder devices disposed about a center axis.

In this preferred form of the first aspect of the present invention, the use of the plurality of pressure-generating cylinder devices effectively downsizes each of the pressure-generating cylinder devices, leading to reduction in size of the mold clamping apparatus.

This preferred form of the first aspect of the present invention may preferably be modified such that each of the plurality of pressure-generating cylinder devices comprises: the pressure-generating piston in the form of a hollow cylinder; the pressure-generating chamber partially defined by an outer circumferential surface of the hollow pressure-generating piston; the first ball-screw shaft located in and extending through a bore of the hollow pressure-generating piston; the first ball-nut fixed to the hollow pressure-generating piston; and the movable-platen-driving-electric motor being fixedly supported by the movable platen and being adapted to rotate the first ball-screw shaft and nut relative to each other.

In the above-preferred form of the first aspect of the present invention, the movable-platen-driving-electric motor is supported by the movable platen, effectively reducing the overall length of the mold clamping apparatus. Moreover, the plurality of the first ball-screw shafts and nuts are disposed about the center axis of the movable platen, assuring a stable application of the driving force to the movable platen via the plurality of the first ball-screw shaft, resulting in an improved stability of the mold opening and closing operation of the mold clamping apparatus.

According to still yet another preferred from of the present invention, the mechanical ram comprises a hollow mechanical ram and the first ball-screw shaft is located in a bore of the hollow mechanical ram.

This arrangement permits that the first ball-screw shaft of the movable-platen-driving device can be arranged within the bore of the mechanical ram with high space utilizing efficiency. In addition, the first ball-screw shaft can be arranged such that the axis of the first ball-screw shaft is aligned with the center axis of the movable platen. Thus, the driving force generated by the one movable-platen-driving-electric motor is stably applied to the movable platen via the first ball-screw shaft.

In the above-preferred form of the invention, preferably, the first ball-screw shaft is axially immovably supported by the base of the injection-molding machine, and the pressure-generating piston is slidably movable within the bore of the mechanical ram so as to constitute the pressure-generating cylinder device, while the first ball-nut is fixed to the pressure-generating piston.

In this preferred form of the invention, the first ball-nut is effectively disposed within the bore of the mechanical ram, with improved space utilization, effectively reducing the axial length of the mold clamping apparatus.

According to yet still another preferred form of the first aspect of the present invention, the mold clamping device further comprising: the first ball-screw shaft of the movable-platen-driving device supported by the base of the injection-molding machine such that the screw shaft is rotatable about an axis thereof and is immovable in an axial direction thereof; the movable-platen-driving-electric motor adapted to rotate the first ball-screw shaft in forward and reversed directions; a hollow mechanical ram radially outwardly disposed of the first ball-screw shaft and fixed at one of axially opposite ends thereof to the movable platen such that the hollow mechanical ram is movable in an axial direction thereof relative to the base of the injection-molding machine and is not rotatable about the axis thereof; the pressure-generating piston radially inwardly disposed of the mechanical ram such that the pressure-generating piston is reciprocally slidably movable in an axial direction of the mechanical ram and is not rotatable about an axis of the mechanical ram, the pressure-generating piston cooperating with the mechanical ram to define a pressure-generating chamber therebetween whose volume is decreased by a movement of the pressure-generating piston toward one of axially opposite ends of the mechanical ram, the pressure-generating piston and the pressure-generating chamber cooperating with each other to constitute the pressure-generating cylinder device; a biasing device adapted to bias the pressure-generating piston of the pressure-generating cylinder device relative to the mechanical ram such that the pressure-generating piston is biased toward one of axial ends of the pressure-generating cylinder device remote from the movable platen; the first ball-nut of the movable-platen-driving device, threaded engaged with the first ball-screw shaft and fixed to the pressure-generating piston of the pressure-generating cylinder device, the first ball-screw shaft and nut being rotated relative to each other so as to reciprocally move the pressure-generating piston; the mold clamping cylinder radially outwardly disposed of the mechanical ram and fixedly supported by the base of the injection-molding machine; the mold clamping ram of the mold clamping cylinder device radially outwardly disposed of the mechanical ram and radially inwardly of the mold clamping cylinder such that the mold clamping ram being slidably movable in an axial direction of the mold clamping cylinder, the mold clamping ram cooperating with the mold clamping cylinder to define therebetween a mold clamping chamber; a positioning electric motor adapted to move the mold clamping ram relative to the mold clamping cylinder for positioning the mold clamping ram relative to the mold clamping cylinder in the axial direction of the mold clamping cylinder; a hydraulic device having a hydraulic circuit for fluid communication between the pressure-generating chamber of the pressure-generating cylinder device and the mold clamping chamber of the mold clamping cylinder device, and having a switch valve alternately connecting and disconnecting the pressure-generating chamber to and from the mold clamping chamber, so that the hydraulic pressure generated in the pressure-generating chamber is transmitted to the mold clamping chamber so as to generate a hydraulic pressure in the mold clamping chamber and apply the hydraulic pressure to the mold claming ram of the mold clamping cylinder device as a hydraulic driving force, when the pressure-generating chamber and the mold clamping chamber are communicate with each other, and the hydraulic pressure generated in the pressure-generating chamber is not applied to the mold clamping chamber so as to move the piston of the pressure-generating cylinder device together with the mechanical ram by rotating the first screw-shaft, thereby opening and closing the mold, when the pressure-generating chamber and the mold clamping chamber are disconnected from each other; an engaging device disposed between the mold clamping ram of the mold clamping cylinder device and the mechanical ram, and being operable for engaging the mold clamping ram and the mechanical ram with each other in order to apply the hydraulic driving force of the mold clamping ram of the mold claming cylinder device to the mechanical ram as a mold clamping force.

In this preferred form of the first aspect of the present invention, the pressure-generating chamber in the form of a hollow cylindrical shape is effectively defined by the inner circumferential surface of the mechanical ram and the outer circumferential surface of the pressure-generating piston. This arrangement permits a formation of the hydraulic chamber with excellent space utilization, and effectively provides a space for disposing the biasing device, for example, between the mechanical ram and the pressure-generating piston.

According to yet, yet still another preferred from of the first aspect of the present invention, the mold clamping apparatus further comprising: a plurality of the pressure-generating cylinder devices including a plurality of pressure-generating cylinders fixed to the rear platen and disposed about an extension of a center axis of the movable platen so as to extend parallel to the center axis of the movable platen, a plurality of the pressure-generating pistons each having a hollow cylindrical shape, and being slidably movable within the plurality of pressure-generating cylinders, respectively, and a plurality of the pressure-generating chambers partially defined by outer circumferential surfaces of said hollow pressure-generating pistons, and having a volume which is decreased by a sliding movement of the plurality of the pressure-generating pistons in a direction remote from the movable platen; a plurality of the movable-platen-driving-electric motors disposed on the movable platen and adapted to rotate the first ball-screw shafts in forward and reversed direction; a plurality of the first ball-nuts thread-engaged with the plurality of the first ball-screw shaft and fixed to the plurality of pressure-generating pistons; a plurality of biasing devices adapted to bias the pressure-generating pistons of the pressure-generating cylinder devices toward the movable platen in an axial direction; the mold clamping cylinder device including the mold clamping cylinder fixedly disposed on the rear platen such that a center axis of the mold clamping cylinder is aligned with the center axis of the movable platen, the mold clamping ram having a hollow cylindrical shape being slidably movable within the mold clamping cylinder, and the mold clamping chamber partially defined by an outer circumferential surface of the mold claming ram and having a volume which is decreased by a sliding movement of the mold clamping ram in a direction remote from the movable platen; a hydraulic device being operable to prohibit a fluid communication between the pressure-generating chambers and the mold clamping chamber for fixedly positioning the pressure-generating pistons relative to the pressure-generating cylinders, so that the movable platen fixed with the pressure-generating cylinders is moved toward and away from the stationary platen for closing and opening the mold, while being operable to allow a fluid communication between the pressure-generating chambers and the mold clamping chamber for a slidably movement of the pressure-generating piston, so that hydraulic pressure generated in the pressure-generating chamber by the rotation of the first ball-screw shaft is applied to the mold clamping chamber of the mold clamping cylinder device, thereby applying a hydraulic driving force to the mold clamping ram; a mechanical ram fixedly disposed on the movable platen so as to extend toward the rear platen along the center axis of the movable platen; the engaging device disposed between the mechanical ram and the mold claming cylinder device, and being operable to engage the mechanical ram and the mold claming ram relative to each other for applying the hydraulic driving force generated by the mold clamping cylinder device to the mechanical ram as the mold clamping force; and an electrically-operated ejector device of ball-screw type including an ejector plate fixed to the movable plate, a second ball-screw shaft located in a bore of the hollow mechanical ram and fixed to one of the mechanical ram and the ejector, an second ball-nut threaded-engaged with the second ball-screw shaft and fixed to the other of said mechanical ram and the ejector; and an ejecting electric motor adapted to rotate the second ball-screw shaft and nut relative to each other so as to generate a relative longitudinal motion of the second ball-screw shaft and nut, thereby driving the ejector.

The second object of the present invention may be achieved according to a second aspect of this invention, which provides a method of controlling operation of a mold clamping apparatus constructed according to the first aspect of the invention, wherein the apparatus further includes a plurality of first engageable protrusions formed on one of the mold clamping ram and the movable platen such that the plurality of first engageable protrusions are spaced apart from each other at regular intervals in a direction in which the mold clamping ram and the movable platen are moved relative to each other, and an engaging member formed on the other of the mold clamping ram and the movable platen and having a plurality of second engageable protrusions which are engageable with the first engageable protrusions, the engaging member being moved toward and away from the first engageable protrusions, the method comprising the steps of: (a) fixing a sample mold consisting of a movable mold half and a stationary mold half to said movable and stationary platens, respectively, the sample mold having a thickness smaller than that of a employed mold to be fixed; (b) moving the movable platen to a mold closing position thereof where the stationary and movable mold halves are held in contact with each other to close the sample mold between the stationary and movable platens; (c) detecting an axial position of the movable platen which is placed in the mold closing position, as an initial position of the movable platen in the axial direction; (e) adjusting an axial position of the mold clamping ram relative to the mold clamping cylinder in order to assure an engagement of the first and second engageable protrusions; (f) detecting an adjusted axial position of the mold clamping ram as an reference position of the mold clamping ram in the axial direction; and (g) adjusting a position of the mold clamping ram relative to the mold clamping cylinder in the axial direction, based on detected data with respect to the initial position of the movable platen and the reference position of the mold clamping ram, in order to assure the engagement of the first and second engageable protrusions, when the movable platen is held in the mold closing position to close an optional mold interposed between the movable and stationary platens.

In a method of controlling the operation of the mold clamping apparatus according to the second aspect of the present invention, the mold clamping ram of the mold clamping cylinder device and the movable platen are stably engaged or connected with each other by means of the engaging device, immediately after the movable platen has been moved to the mold closing position by the rectilinear driving force of the movable-platen-driving device of ball-screw type, irrespective of the thickness of the optional mold. This arrangement permits effectively stabilizing injection-molding operation using the mold clamping apparatus, and effectively shortening a cycle time of the injection molding operation using the mold clamping apparatus.

The second object of the present invention may also be achieved according to a third aspect of this invention, which provides a method of controlling operation of a mold clamping apparatus constructed according to the first aspect of the invention, wherein the movable-platen-driving-electric motor comprises an electric servomotor. In this case, the method further comprising the steps of: controlling an output torque of the electric servomotor, based on a hydraulic pressure in the pressure-generating chamber of the pressure-generating cylinder device, during the mold clamping apparatus clamp the mold.

In the third aspect of the invention, the electric servomotor is employed as the movable-platen-driving-electric motor, assuring an improved accuracy of control for positioning the mold, or the movable platen. Therefore, the presently preferred method makes it possible to control with high preciseness the motion of the movable platen, when the mold clamping apparatus is operated for protecting the mold in response to a detection of a foreign member existing between the mold halves, for example. In the presently preferred form of the method, the position of the mold upon ejecting the molded article from the mold, can be suitably controlled with high preciseness, thereby reducing a ratio of fail in chucking of the molded article ejected from the mold. For instance, the output torque of the servomotor may be controlled based on the hydraulic pressure force in the mold clamping chamber which is applied as the mold clamping force to the movable platen, permitting a control of the mold clamping force with high-preciseness and with high responsibility.

Alternatively, the second object of the present invention may also be achieved according to a fourth aspect of this invention, which provides a method of controlling operation of a mold clamping apparatus constructed according to the first aspect of the invention, wherein movable-platen-driving-electric motor comprises an electric servomotor. In this case, the method further comprises the steps of: decreasing a hydraulic pressure in the mold clamping chamber by gradually decreasing a value of an output torque of the servomotor to a predetermined value so that a decrease of a hydraulic pressure in the mold clamping chamber is completed.

In the above form of the method, the output torque of the electric servomotor is controlled to be gradually reduced, effectively, stably and easily decreasing a magnitude of impact occurring upon decreasing the mold clamping force in a mold clamping force decreasing operation.

Further, the second object of the present invention may also be achieved according to a fifth aspect of this invention, which provides a method of controlling operation of a mold clamping apparatus constructed according to the first aspect of the invention, wherein the movable-platen-driving-electric motor comprises an electric servomotor. In this case, the method further comprising the steps of: decreasing a hydraulic pressure in the mold clamping chamber by changing gradually or continuously a rotation speed of the servomotor in a direction for generation a reduction of the hydraulic pressure in the mold clamping chamber, until is detected at least one of conditions: that a predetermined period of time has passed which is required for decreasing the pressure in the mold clamping chamber, and that the pressure in the mold clamping chamber has been reduced to a predetermined level.

In the above form of the method, the rotation speed of the servomotor is controlled, thereby effectively, stably and easily decreasing a magnitude of impact occurring upon decreasing the mold clamping force in the mold clamping force decreasing operation. In particular, since the servomotor is controlled based on its rotating velocity, the mold clamping force can be continuously reduced in the mold clamping force decreasing operation.

The above preferred forms of the method of the present invention, may be modified such that the mold clamping apparatus further includes a biasing device adapted to bias the pressure-generating piston toward a fully retracted position thereof to increase a volume of a pressure-generating chamber of the pressure-generating cylinder device. In this case, the method further comprises the steps of: controlling an output torque of the servomotor taken into account of a force required for moving the pressure-generating piston against the biasing force applied thereto.

In the above preferred form of the second aspect of the invention, the servomotor is controlled taken into account of biasing force of the biasing device, so that the presently preferred control method permits the high-precisely control of the mold clamping force, while assuring the biasing device to generate a predetermined biasing force.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
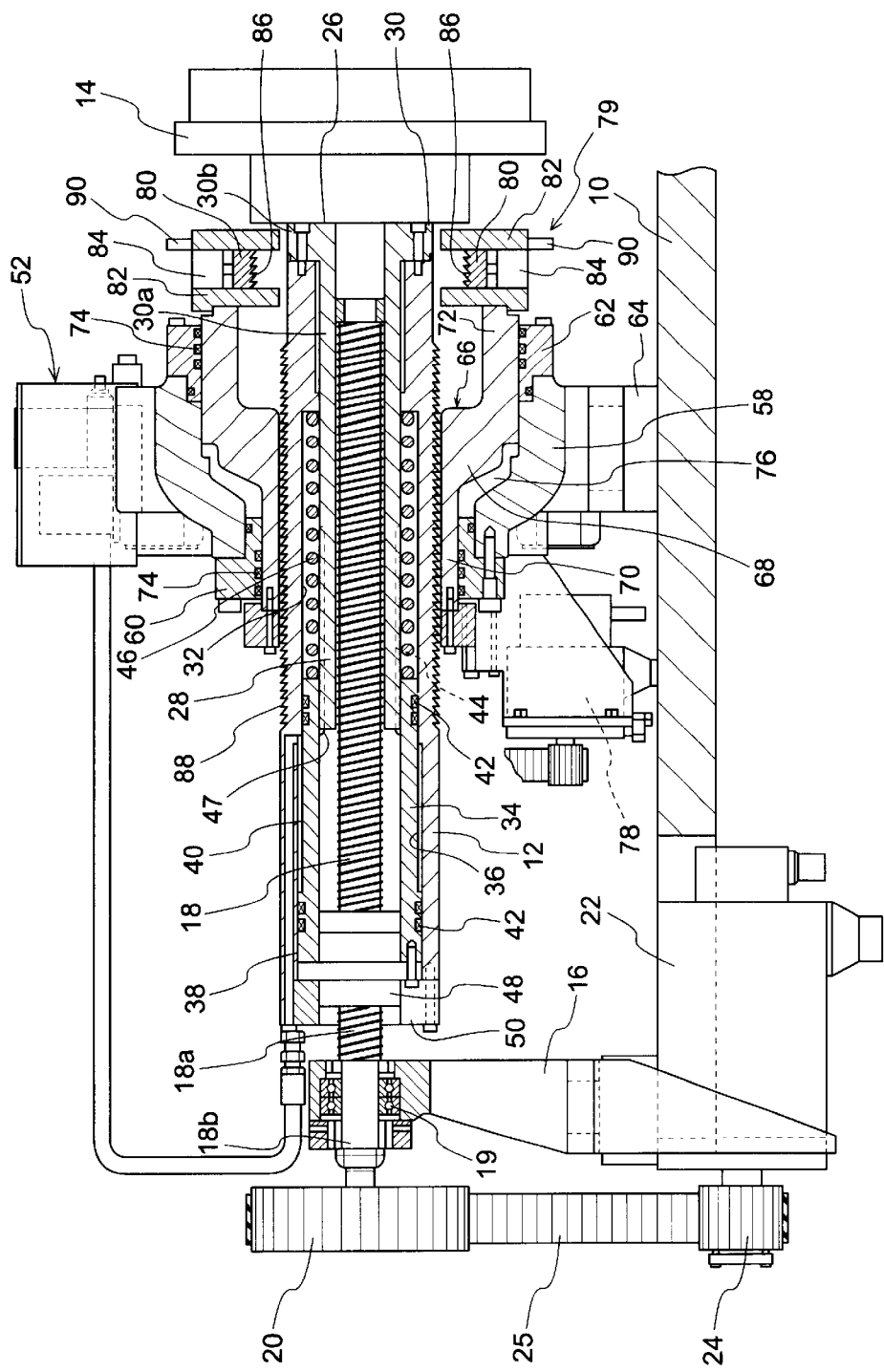
FIG. 1 is a fragmentary view in longitudinal cross section of a mold clamping apparatus constructed according to one preferred embodiment of the present invention.

Referring first to FIG. 1, there is schematically shown the mold clamping apparatus used in an injection-molding machine, constructed according to a first embodiment of the present invention. The mold clamping apparatus includes a mold opening and closing cylinder 12 as a mechanical ram which is supported by a base 10 of the injection molding machine so as to axially movably extend in a horizontal direction, and a movable platen 14 fixed to one of opposite axial ends of the mold opening and closing cylinder 12. The mold opening and closing cylinder 12 is reciprocally moved in its axial direction so that the movable platen 14 is reciprocally moved toward and away from a stationary platen (not shown) disposed opposite to the movable platen 14. As well known in the art, the movable platen 14 is supported by means of a plurality of tie bars (not shown) and is reciprocally movable along the tie bars from its fully retracted position on the left-hand as seen in FIG. 1 to its fully advanced position on the right-hand as seen in FIG. 1.

Described more specifically, the mold clamping device of the present embodiment further includes a bracket 16 disposed on the base 10, and a first ball-screw shaft 18 extending in its axial direction parallel to the horizontal direction. The first ball-screw shaft 18 is supported at one of its axially opposite ends i.e., at its left-hand end as seen in FIG. 1 by the bracket 16 via a bearing 19 such that the first ball-screw shaft 18 is rotatable about its axis while being immovable in its axial direction. The first ball-screw shaft 18 has a right-hand protruding portion 18a protruding from one of axial end faces (right-hand end face) of the bracket 16 with a sufficient axial length, and a left-hand protruding portion 18b protruding from the other axial end face (left-hand end face) of the bracket 16 with a slight axial length. The left-hand protruding portion 18b of the first ball-screw shaft 18 is fixed with a first toothed pulley 20. A first servomotor 22 as a movable-platen-driving-electric motor is fixed to the bracket 16 and the output shaft of the first servomotor 22 is fixed to a second toothed pulley 24. The first and second toothed pulleys 20, 24 are mechanically connected with each other by a toothed belt 25 wound around the outer circumferential surfaces of the pulleys 20, 24, so that the rotation of the first ball-screw shaft 18 is generated and controlled by rotation of the first servomotor 22 transmitted through the first and second toothed pulleys 20, 24 and the toothed belt 25.

The mold opening and closing cylinder 12 has a generally hollow cylindrical shape and is radially outwardly disposed of the right-hand protruding portion 18a of the first ball-screw shaft 18 with a given spacing therebetween, so as to cover the outer circumferential surface of the first ball-screw shaft 18. The mold opening and closing cylinder 12 which is disposed coaxial with the ball-screw shaft 18 is movable relative to the ball-screw shaft 18 in the axial direction. In the advanced-side or right-hand axial open end of the mold opening and closing cylinder 12, there is inserted a cylindrical outward flange member 28 which extends with an axial length smaller than that of the mold opening and closing cylinder 12 (a substantially half of the axial length of the mold opening and closing cylinder 12, in this embodiment). The outward flange member 28 has a small-diameter portion 30a and a large-diameter portion 30b, such that the small-diameter portion 30a is located within a bore of the mold opening and closing cylinder 12, while the large-diameter portion 30b is placed on and bolted to the advanced-side axial open end face of the mold opening and closing cylinder 12. The small-diameter portion 30a of the outward flange member 28, which is located within the bore of the mold opening and closing cylinder 12, has an inside diameter larger than the outside diameter of the first ball-screw shaft 18, and has an outside diameter smaller than the inside diameter of the mold opening and closing cylinder 12. Thus, the first ball-screw shaft 18 is reciprocally and rotatably movable within a bore of the outward flange member 28, while the mold opening and closing cylinder 12 cooperate with the outward flange member 28 to define therebetween an annular cylinder receiving space 32 which is open in the retracted-side axially open end of the mold opening and closing cylinder 12. The mold opening and closing cylinder 12 has an axial length slightly larger than that of the right-hand protruding portion 18a of the first ball-screw shaft 18. Therefore, the advanced-side axial open end 26 of the mold opening and closing cylinder 12 is protruded from the corresponding axial end face of the first ball-screw shaft 18 with a slight axial length, to be fixed with the movable platen 14.

Within the bore of the mold opening and closing cylinder 12, a cylindrical piston 34 as a pressure-generating piston, is slidably, reciprocally and fluid-tightly movable in the axial direction. The cylindrical piston 34 has a large-diameter portion 38 at its left-hand axial end, while the bore of the mold opening and closing cylinder 12 has a large-diameter portion 36 at its retracted-side portion adjacent to the bracket 16. The large-diameter portion 38 of the cylindrical piston 34 is slidably and fluid-tightly fitted into the large-diameter portion 36 of the bore of the cylinder 12 to define therebetween a hydraulic chamber 40 in the form of a cylindrical void as a pressure-generating chamber.

That is, the hydraulic chamber 40 has a volume which is changed by the reciprocal movement of the cylindrical piston 34 within the mold opening and closing cylinder 12. The volume of the hydraulic chamber 40 is decreased by the movement of the cylindrical piston 34 toward its fully advanced position located in the right hand of FIG. 1, and increased by the movement of the cylindrical piston 34 toward its fully retracted position located in the left hand as seen in FIG. 1. In the interface between the inner circumferential surface of the mold opening and closing cylinder 12 and the outer circumferential surface of the cylindrical piston 34, there is disposed a plurality of annular sealing member 42 which are fitted on the outer circumferential surface of the cylindrical piston 34 at the axially opposite ends thereof so that the hydraulic cylinder chamber 40 is interposed between the sealing members 42. It is noted that the mold opening and closing cylinder 12 and the cylindrical piston 34 are cooperate to constitute a pressure-generating cylinder device.

The right-hand axial end portion of the cylindrical piston 34 is always radially outwardly disposed on and slidably contact with the outward flange member 28 such that a plurality of protrusions 47 formed in the inner circumferential surface of the cylindrical piston 34 are engaged with a plurality of grooves 44 formed in the outer circumferential surface of the flange member 28. This arrangement permits a relative displacement of the cylindrical piston 34 and the outward flange member 28 along the protrusions and grooves, and inhibits a relative rotation of the piston 34 and the flange member 28 about the center axis of the cylinder 12.

Further, a coil spring 46 is disposed radially outwardly of the outward flange member 28. The coil spring 46 is adapted to apply a biasing force to the cylindrical piston 34 so that the cylindrical piston 34 is held in its fully retracted position for increasing the volume of the hydraulic chamber 40. The fully retracted position of the cylindrical piston 34 is defined by an abutting contact of the cylindrical piston 34 with an radially inward protrusion 50 having an annular shape fixed to the retracted-side open end of the mold opening and closing cylinder 12.

A first ball-nut 48 is thread engaged with the first-ball-screw shaft 18 and is bolted to the retracted end portion of the cylindrical piston 34. In this arrangement, the first ball-nut 48 is slidably movable within a bore of the mold opening and closing cylinder 12 together with the cylindrical piston 34, while being unrotatable about a center axis of the cylindrical piston 34.

In the mold clamping apparatus constructed as described above, the first ball-screw shaft 18 is rotated by the first servomotor 22 so that the first ball-nut 48 and the cylindrical piston 34 fixed to the first ball-nut 48 are moved in the axial direction, since the rotation of the first ball-screw shaft 18 is converted to the longitudinal motion of the first ball-screw shaft 18 and the first ball-nut 48. In this respect, the cylindrical piston 34 is forcedly placed in its initial position, i.e., its fully retracted position by means of the coil spring 46. Therefore, the cylindrical portion 34 is held in its initial position and moved together with the mold opening and closing cylinder 12 toward its fully advanced position, until a driving force in the advanced direction, which is generated by the rotation of the first screw shaft 18, and which is applied to the first ball-nut 48, exceeds the sum of the hydraulic pressure force of the hydraulic chamber 40 and the biasing force of the coil spring 46. In this condition, namely, the sum of the hydraulic pressure and the biasing force is larger than the driving force in the advanced direction, the first ball-screw shaft 18 is rotated in the reverse direction, and the driving force in the retracted direction is applied to the first ball-nut 48, the mold opening and closing cylinder 12 and the cylindrical piston 34 are retracted together in the axial direction, with the cylindrical piston 34 being held in abutting contact with the radially inward protrusion 50.

By the reciprocal movement of the mold opening and closing cylinder 12 in the axial direction as described above, the movable platen fixed to the mold opening and closing cylinder 12 is accordingly reciprocally moved in the axial direction for thereby opening and closing the mold. In the present embodiment, the first ball-screw shaft 18, the first ball-nut 48 and the first servomotor 22 are cooperated to each other to constitute a movable-platen-driving device.

Figure 2:
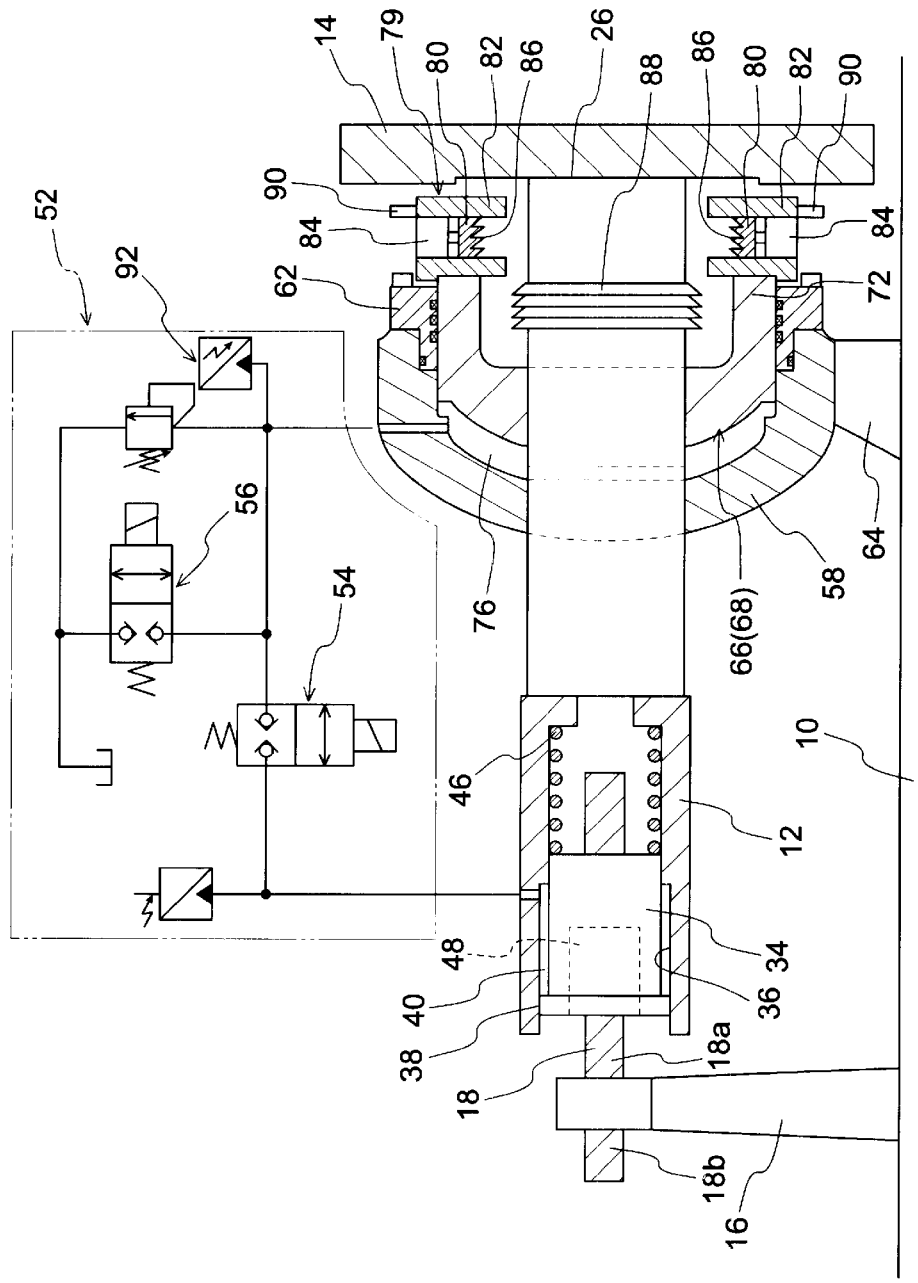
FIG. 2 is a view schematically showing a hydraulic device used in the mold clamping apparatus of FIG. 1.

As illustrated in FIG. 2, the mold clamping apparatus of the present embodiment includes a hydraulic unit 52 constituting a hydraulic circuit connected to the hydraulic chamber 40. The hydraulic unit 52 includes a first and a second solenoid operated switch valve 54, 56 by which the hydraulic chamber 40 is alternately connected to and disconnected from the hydraulic unit 52. With the hydraulic chamber 40 being disconnected from the hydraulic unit 52, the first ball-screw shaft 18 is rotated so that the mold opening and closing cylinder 12 is moved integrally with the cylindrical piston 34 in the axial direction.

On the outer circumferential surface of the mold opening and closing cylinder 12, there is disposed a generally cylindrical mold clamping cylinder 58 with a radial spacing therebetween. The mold clamping cylinder 58 is integrally formed with a rear platen and fixedly supported by a bracket 64 protruded from the base 10, in the vertical direction, such that the mold clamping cylinder 58 is never interfere the motion of the mold opening and closing cylinder 12. The mold clamping cylinder 58 has an axially intermediate tapered portion whose diameter gradually increases toward the advanced side of the mold opening and closing cylinder 12, which is located adjacent to the movable platen 14, and a small-diameter sealing flange 60 and a large-diameter sealing flange 62 which are bolted to the small-diameter and large-diameter axial open ends of the intermediate tapered portion, respectively.

Within the mold clamping cylinder 58, a mold clamping ram 66 is slidably movable in the axial direction. The mold clamping ram 66 has an inside diameter larger than the outside diameter of the mold opening and closing cylinder 12, so that the mold clamping ram 66 is radially outwardly disposed of the mold opening and closing cylinder 12, with a suitable radial spacing therebetween, without disturbing the motion of the mold opening and closing cylinder 12. In addition, the mold clamping ram 66 has a configuration similar to that of the mold clamping cylinder 58 with a slightly small dimension. The mold clamping ram 66 has an intermediate tapered portion 68 whose diameter gradually increases toward the advanced side of the mold opening and closing cylinder 12, and a small-diameter cylindrical portion 70 and a large-diameter cylindrical portion 72 which are integrally formed with the small and large-diameter open ends of the intermediate tapered portion, respectively.

That is, the mold clamping ram 66 is slidably movable within the mold clamping cylinder 58 such that the interface between the small-diameter cylindrical portion 70 of the mold clamping ram 66 and the small-diameter sealing flange 60 is slidably and fluid-tightly sealed by an annular sealing member 74 interposed therebetween, while the interface between the large-diameter cylinder portion 72 of the mold clamping ram 66 and the large-diameter sealing flange 62 is slidably and fluid-tightly sealed by the annular sealing member 74 interposed therebetween. This arrangement provides a mold clamping chamber 76 defined between the mold clamping cylinder 58 and mold clamping ram 66 which extends in the circumferential direction. The hydraulic pressure generated in the mold clamping chamber 76 is applied to the mold clamping ram 66 so that the mold clamping ram 66 is moved toward its advanced position in the axial direction. In the present embodiment, the mold clamping cylinder 58 and the mold clamping ram 66 cooperate to constitute a mold clamping device.

According to the present embodiment, the mold clamping cylinder 58 is adapted to support a second servomotor 78 used as a positioning electric motor, which is served to adjust and control axial positions of the mold clamping ram 66 and the mold clamping cylinder 58 relative to each other.

The end face of the large-diameter cylindrical portion 72 of the mold clamping ram 66 is fixed with an engaging device 79 as an engaging device. The engaging device 79 includes a pair of semi circular nut halves 80, 80 which are opposite to each other in the diametric direction thereof, and guide housings 82, 82 which are fixedly disposed on the mold clamping ram 66, by which the nut halves 80, 80 are supported diametrically movable and axially immovable. The guide housings 82, 82 are fixed with cylinder devices 84, 84, respectively, by which the nut halves 80, 80 are moved toward and away from each other, thereby the pair of nut halves 80, 80 are moved toward and away from the mold opening and closing cylinder 12.

Each of the nut halves 80, 80 has an inner surface opposite to the outer circumferential surface of the opening and closing cylinder 12, which is formed with a plurality of first engageable protrusions 86 which extend in the circumferential direction of the nut half 80 with a serrated shape in cross section, and are equally spaced apart from each other in the axial direction. On the other hand, the outer circumferential surface of the mold opening and closing cylinder 12 is also formed with a plurality of second engageable protrusions 88 which extend in the circumferential direction thereof, with a serrated shape in cross section corresponding to that of the first protrusions, and which are equally spaced apart from each other in the axial direction. The first and second protrusions 86, 88 are similarly arranged in the axial direction at regular intervals.

When the pair of nut halves 80, 80 are held by the respective cylinder devices 84, 84 in the retracted positions thereof that are remote from the mold opening and closing cylinder 12 in the radial direction, the mold clamping ram 66 is disconnected from the mold opening and closing cylinder 12 and can be moved in the axial direction without any restriction by the mold clamping ram 66.

After the mold opening and closing cylinder 12 is advanced to some extent so that the second engageable protrusions 88 formed on the outer circumferential surface of the mold opening and closing cylinder 12 are opposite to the first engageable protrusions 86, 86 formed on the inner circumferential surface of the nut halves 80, 80 with a radial spacing therebetween, the pair of nut halves 80, 80 are moved by the respective cylinder device 84, 84 toward the advanced position thereof so as to engage or connect the first and second engageable protrusions 86, 88 with each other. In this condition, the mold clamping ram 66 is integrally connected with the mold opening and closing cylinder 12 via the engaging device 79 so that the ram 66 is immovable in the axial direction relative to the mold opening and closing cylinder 12. In the present embodiment, a sensor 90 such as a limit switch is disposed in the vicinity of the nut halves 80, 80 for detecting the radial direction of the nut halves 80, 80. Based on the output signal of the sensor 90, it is determined whether the nut halves 80, 80 and the mold opening and closing cylinder 12 are engaged with each other or not.

With the mold clamping ram 66 and the mold opening and closing cylinder 12 being engaged with each other by the engaging device 79, the hydraulic pressure generate in the hydraulic chamber 40 is transmitted to the mold clamping chamber 76, for thereby moving the mold clamping ram 66 toward its advanced position with the hydraulic pressure applied to the mold clamping ram 66. The hydraulic driving force applied to the mold clamping ram 66 is transmitted to the movable platen 14, thereby applying a mold clamping force to the movable platen 14.

The hydraulic unit 52 of the present invention is arranged for applying the hydraulic pressure generated in the hydraulic chamber 40 to the mold clamping chamber 76 such that the hydraulic chamber 40 of the pressure-generating cylinder device 70 is connected to the mold clamping chamber 76 and the hydraulic pressure generated in the pressure-generating cylinder device 70 is transmitted to the mold clamping chamber 76, thereby generating a hydraulic pressure in the mold clamping chamber 76. Described more specifically, the hydraulic chamber 40 is connected to the mold clamping chamber 76 via the first solenoid operated switch valve 54. The switch valve 54 is opened and closed for connecting and disconnecting between the two chambers 40, 76, respectively. With the switch valve opened for fluid communication between the two chambers 40, 76, the first ball-screw shaft 18 is rotated for applying the driving force resistive to the biasing force of the coil spring 46 to the cylindrical piston 34, thereby generating the advance movement of the cylindrical piston 34 in the axial direction. The sliding advance movement of the cylindrical piston 34 causes the compression of the coil spring 46 in the axial direction, resulting in an increase in the hydraulic pressure in the hydraulic chamber 40. Thus, the increased hydraulic pressure in the hydraulic chamber 40 is transmitted into the mold clamping chamber 76 through the first solenoid valve 54.

In the present embodiment, the mold clamping ram 66 of the mold clamping chamber 76 has a pressure-receiving surface area which is sufficiently enlarged in comparison with that of the cylindrical piston 34 of the hydraulic chamber 40. In particular, the hydraulic chamber 40 is formed between the mold opening and closing cylinder 12 and the cylindrical piston 34 with a relatively small radial spacing therebetween, assuring a sufficiently reduced pressure-receiving surface area of the cylindrical piston 34. Therefore, the hydraulic pressure generated in the hydraulic chamber 40 is sufficiently increased in the mold clamping chamber 76, resulting in a sufficiently increased axial driving force of the mold clamping ram 66, that is a sufficiently increased mold clamping force.

The present mold clamping apparatus constructed as described above is suitably operated to open and close the mold, and to clamp the mold, according to the following method, for example.

Initially, the mold opening and closing cylinder 12 is moved to its retracted position wherein the mold is open, as shown in FIG. 1. Subsequently, the first solenoid operated switch valve 54 is placed in its closed position for inhibiting the fluid communication between the hydraulic cylinder 40 and the mold clamping chamber 76. In this condition, the first servomotor 22 is operated to rotate the first ball-screw shaft 18 in its forward direction. With the forwarding rotation of the first ball-screw shaft 18, the cylindrical piston 34 and the mold opening and closing cylinder 12 are integrally moved toward the advanced position thereof. The movable platen 14 attached to the advanced axial end of the mold opening and closing cylinder 12 is accordingly moved toward its mold closing position wherein the movable platen 14 is close to the stationary platen (not shown) to close the mold therebetween.

After the mold is closed between the stationary and movable platens 14, the cylinder device 84, 84 are operated to move the nut halves 80, 80 to the advanced position thereof so as to be engaged with the mold opening and closing cylinder 12. Subsequently, the solenoid coil of the first solenoid-operated switch valve 54 is energized to open the first switch valve 54 for fluid communication between the hydraulic chamber 40 and the mold clamping chamber 76. With the two chambers, 40, 76 being communicated with each other, the first servomotor 22 is resume its operation to rotate the first ball-screw shaft 18 in the forward direction, so as to slidably move the cylindrical piston 34 toward its advanced position relative to the mold opening and closing cylinder 12. The advanced movement of the cylindrical piston 34 causes an increase in the hydraulic pressure in the hydraulic chamber 40, which is transmitted to the mold clamping chamber 76 through the first switch valve 54, thereby increasing the hydraulic pressure in the mold clamping chamber 76. The increased hydraulic pressure in the mold clamping chamber 76 is applied to the mold clamping ram 66, whereby the mold clamping ram 66 and the mold opening and closing cylinder 12 are integrally moved toward the stationary platen, so that the movable platen 14 is force to the stationary plate for clamping the mold interposed therebetween.

With the mold being clamped as described above, the injection molding is operated to mold a product within the mold. Successive to the injection molding, the hydraulic pressure in the mold clamping chamber 76 is decreased as follows: Initially, with the hydraulic chamber 40 and the mold clamping chamber 76 communicated with each other by opening the first switch valve 54, the first servomotor 22 is operated to rotate the first ball-screw shaft 18 in its reverse direction, to move the movable platen 14 toward its mold closing position.

When the movable platen 14 is moved to its mold closing position, the cylinder devices 84, 84 are operated to move the nut halves 80, 80 toward the retracted position thereof for loosing the engagement between the nut halves 80, 80 and the mold opening and closing cylinder 12. Subsequently, the solenoid coil of the first solenoid operated switch valve 54 is de-energized to close the switch valve 54 for fluid-tightly enclosing the hydraulic chamber 40. In this condition, the first servomotor 22 resumes its operation to rotate the first ball-screw shaft 18 in the reverse direction, whereby the cylindrical piston 34 and the mold opening and closing cylinder 12 are integrally slidably moved toward the mold opening position thereof, thereby opening the mold.

In the present mold clamping apparatus, it is required to engage or connect the nut halves 80, 80 with the mold opening and closing cylinder 12, after the mold closing operation and before the mold clamping operation. Insufficient positioning of the first and second engageable protrusions 86, 88 relative to each other may possibly cause fail in engagement between the first and second engageable protrusions 86, 88. For suitable engagement of the nut halves 80, 80 and the mold opening and closing cylinder 12, the operation for positioning of the first engageable protrusions 86, 86 relative to the second engageable protrusions 88, using the second servomotor 78, may be suitably controlled according to the following method, for example. In this respect, a suitable controller (not shown) including an input portion, a micro processor unit (MPU), a memory portion, a setting portion and output portion may be utilized for controlling the operation of the second servomotor 78, as well known in the art.

Initially, an absolute angular-position of the first servomotor 22 is determined according to the following method, for example. In this respect, the absolute angular-position of the first servomotor 22 is determined to provides a reference position of the mold claming ram 66 relative to the mold opening and closing cylinder 12 in which the first and second engageable protrusions 86, 88 are fully engaged with each other. First, a sample mold consisting of a pair of mold halves in the form of a metallic block are fixed to the stationary and movable platens, respectively. The sample mold has a thickness as a minimum reference mold thickness which is made smaller than that of an employed mold to be fixed these platens in the molding operation. Subsequently, the mold opening and closing cylinder 12 is advanced either by a manual operation or by a reduced-speed operation, until the mold halves are brought into an abutting contact with each other at the mold closing position, in order to detect a mold closing position of the mold opening and closing cylinder 12 as a mechanical zero position of the mold opening and closing cylinder 12, as an initial position of the movable platen. In this condition, an angular-position of the first servomotor 22 is also detected and stored in the memory portion of the controller indicated above as the neutral angular position (0.00 mm) of the first servomotor 22.

Figure 4:
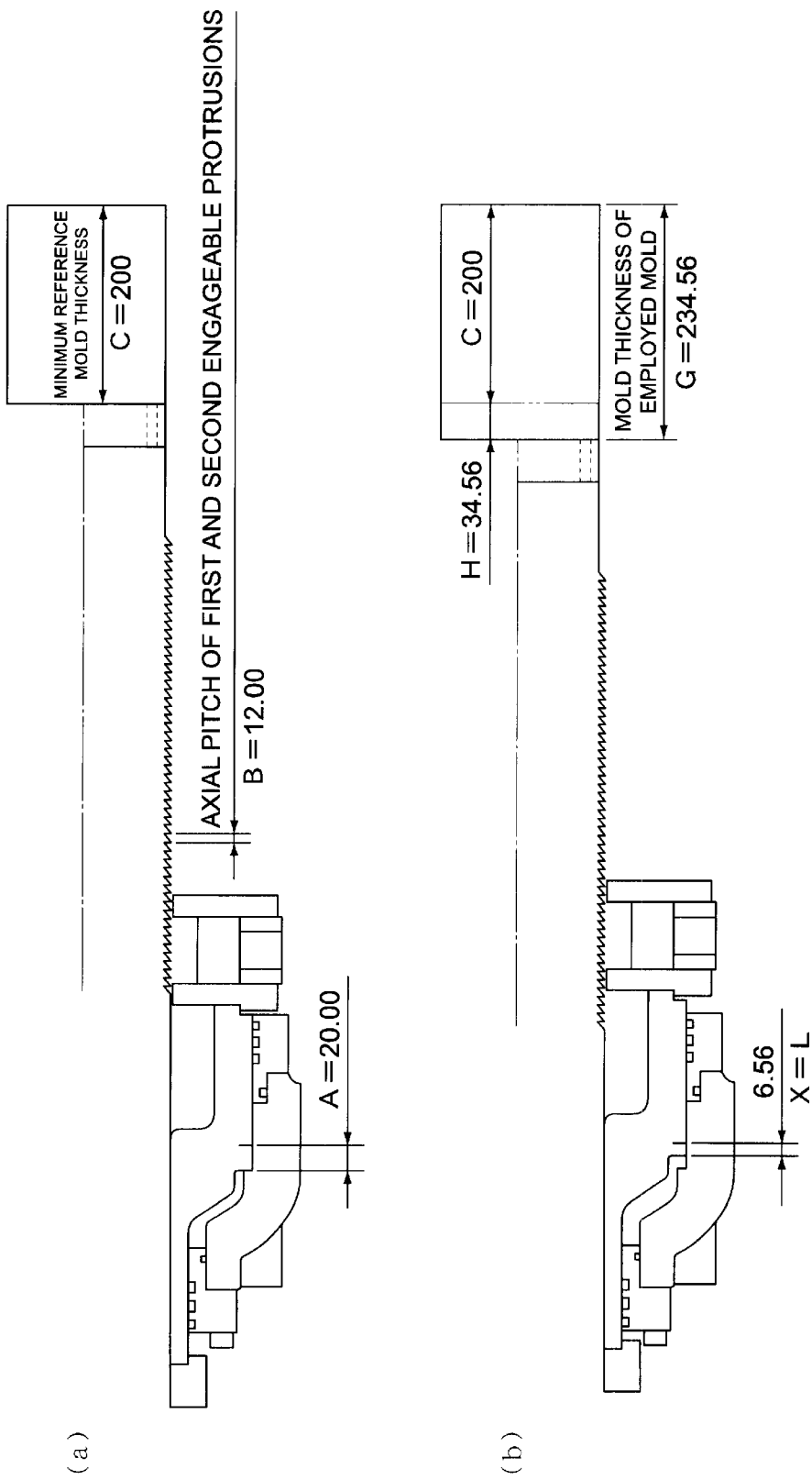
FIGS. 4(a) and 4(b) are views schematically showing specific operation of the mold clamping apparatus for adjusting the engaging portion of the mold clamping ram and the mold opening and closing cylinder, according to the control flow of FIG. 3.

Then, the fully retracted position of the mold clamping ram 66 (mechanical limit of the retracted movement thereof) is measured based on the fully advanced position of the ram 66 (mechanical limit of the advanced movement thereof) as a mechanical zero position of the mold clamping ram 66, and the measurement A(mm) is stored in the memory portion of the controller. In order to engage the first engageable protrusions 86 of the half nuts 88, 88 with the second engageable protrusions 88 of the mold opening and closing cylinder 12 in the condition as shown in FIG. 4(a), that is, in the condition that the mold opening and closing cylinder 12 is held in its mold closing position, i.e., the first servomotor 22 is held in its neutral angular position, and the mold clamping ram 66 is held in its fully retracted position, an axial position of the mold clamping cylinder 58 relative to the mold clamping ram 66 is mechanically adjusted. In this condition, the fully retracted position of the mold clamping ram 66 is detected and stored as the above-indicated reference position of the mold clamping ram 66 in the memory portion of the controller, while the angular position of the first servomotor 22 which provides the reference position of the mold clamping ram 66, is detected and stored as the absolute value of the first servo motor 22.

Figure 3:
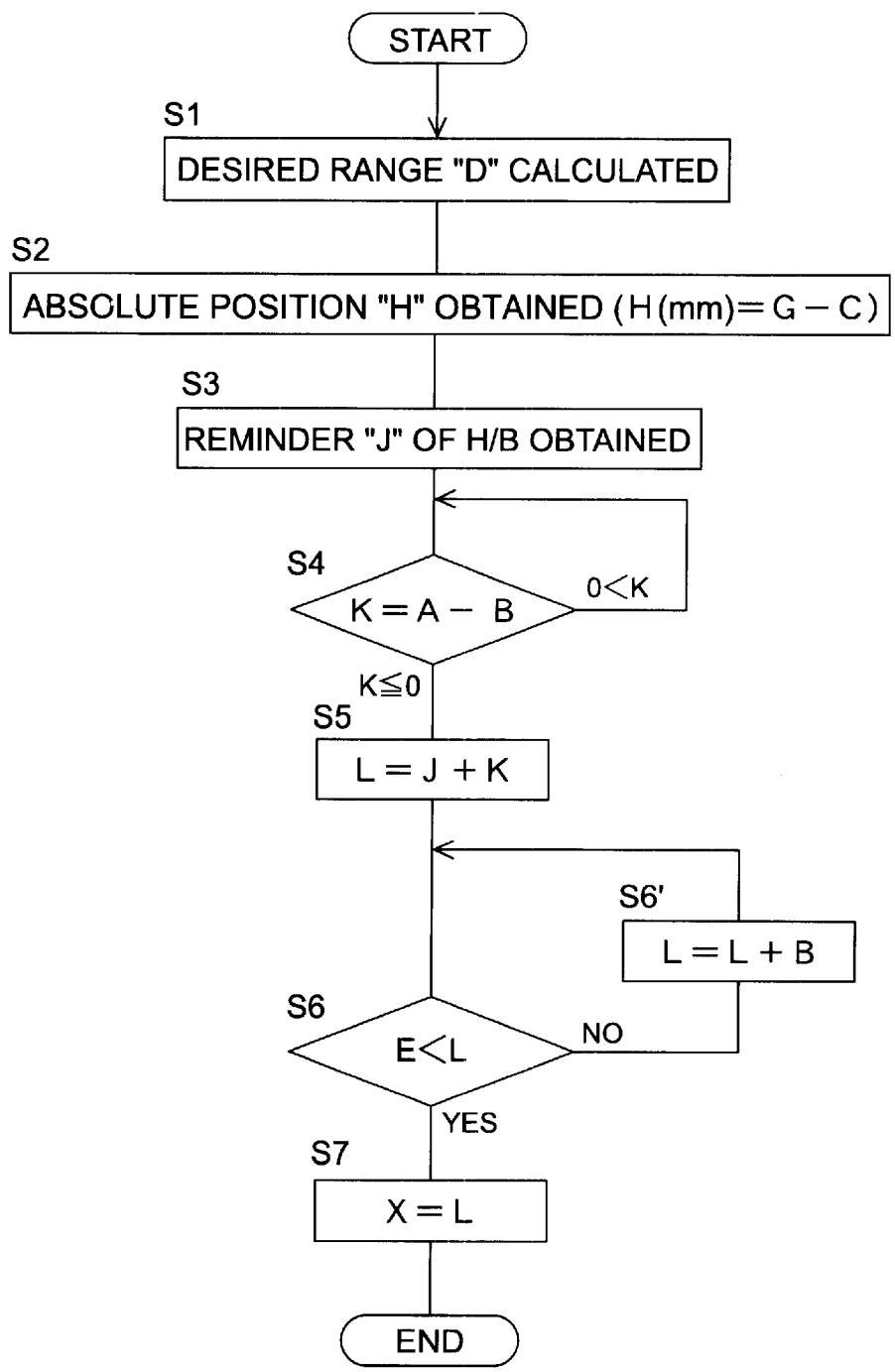
FIG. 3 is a flow chart representing a control program according to which an engaging position of a mold clamping ram and a mold opening and closing cylinder is adjusted.

Subsequently, the employed mold consisting of a movable and stationary mold halves are fixed to the movable and stationary platens, respectively. A desired angular position of the second servomotor 78 is calculated according to a calculation-flow as shown in FIG. 3 so that the axial position of the mold clamping ram 66 is adjusted relative to the mold opening and closing cylinder 12 which is held in its mold closing position, whereby the first and second protrusions 86, 88 are fully engaged with each other. The desired angular position of the second servomotor 78 is calculated as follows, for example: First, there is calculated a desirable range of the amount of the axial displacement of the mold clamping ram 66, according to the following equations: (1) and (2). Then, the desired angular position of the servomotor 78 is calculated in order to place the mold clamping ram 66 on a desired axial position (X mm) for assuring the fully engagement of the first and second protrusions 86, 88.

$$F=E+B \tag{1}$$

$$E<D \leq F \tag{2}$$

where

D (mm) is the desired range of the amount of the axial displacement of the mold clamping ram 66;

A (mm) is the fully retracted position of the mold clamping ram 66, so that the mold clamping ram 66 is mechanically retractable to its fully retracted position relative to the mold opening and closing cylinder 12;

B (mm) is an axial pitch of the first or second engageable protrusions that is equal to an actually required amount of axial displacement of the mold clamping ram 66, relative to the mold opening and closing cylinder 12 for assuring the fully engagement of the first and second engageable protrusions, so that the value of B is set to the desired range D;

E (mm) is a minimum value of D, which is determined taken into account an amount of extension of the tie bars upon clamping the mold; and F (mm) is a maximum value of D, which is calculated according to the above-indicated equation (1) provided that the value of F is smaller than the value of A.

There will be described in detail the calculation for calculating the desired angular position of the second servomotor 78 with reference to the flow chart of FIG. 3.

When the calculation of the desired angular position of the second servomotor 78 is started, the control flow of the controller goes to Step 1 to calculate the desired range: D of the amount of the axial displacement of the mold clamping ram 66, according to the above-indicated equations (1) and (2) as discussed above. The Step 1 is followed by Step 2 to obtain an absolute position: H of the mold opening and closing cylinder 12 in its axial direction, upon closing the mold, by subtracting a valve: C of the thickness of the sample mold from a value: G of the thickness of the employed mold. The absolute position: H represent the axial position of the mold opening and closing cylinder 12 as shown in FIG. 4(b) with respect to the axial position of the mold opening and closing cylinder 12 as shown in FIG. 4(a). Step 2 is followed by Step 3 wherein the absolute position: H obtained in Step 2 is divided by a pitch of the first and second protrusions in order to obtain a reminder: J. Step 3 is followed by Step 4 to determined whether a value: K obtained by subtracting the pitch: B from the fully retracted position: A is not larger than zero. If an affirmative decision is obtained in Step 4, the control flow of the controller goes to Step 5 to sum up the values J and K to obtain a value: L. If a negative decision is obtained in Step 4, the control flow of the controller goes back to Step 4. This means that the Step 4 is repeated until the value K becomes not larger than zero.

Step 5 is followed by Step 6 to determine whether the value: L is larger than the above-indicated minimum value: E of the desired range: D of the amount of the axial displacement of the mold clamping ram 66. If a negative decision is obtained in Step 6, the control flow of the controller goes to Step 6' to add the value of pitch: B to the value: L, and then goes back to Step 6. This means that the Step 6 is repeated until the value: L becomes larger than the value: E, and not larger than the value: F. It is noted that the value: J is certainly smaller than the value: B, so that the value J is always smaller than or equal to the above-indicated maximum value: F of the value: D.

Step 6 is followed by Step 7 to set the obtained value: L to the above-indicated desired axial position X of the mold clamping ram 66, whereby the desired angular position of the second servomotor 78 is accordingly determined. The control flow of the controller is terminated.

Referring next to FIG. 4(a), there will be described in detail the calculation for obtaining the desired angular position of the servomotor 78, based on specific values, which are indicated in the following Table 1, of one example of the present mold clamping apparatus by way of example.

TABLE 1

| ITEMS | SYMBOLES | VALUES (mm) |
|---|---|---|
| Mechanical limit of axial displacement of Ram 66 | A | 20.00 |
| Pitch of first or second engageable protrusions | B | 12.00 |
| Minimum reference mold thickness | C | 200.00 |
| Minimum value of the desired range: D of the amount of axial displacement of Ram 66 | E | 6.00 |
| Mold thickness of employed mold | G | 234.56 |

F = E + B = 6.00 + 12.00 = 18.00 (mm)
H = G − C = 234.56 − 200.00 = 34.56 (mm)
H/B = 34.56/12.00 = 2 with a reminder of 10.56 ∴ J = 10.56
K = A − B = 20 − 12 = 8.00
0 < K, therefore,
K = 8.00 − 12.00 = −4.00 (mm)
L = J + K = 10.56 − 4 = 6.56 (mm)
E < L, therefore,
X = L = 6.56 (mm)

As illustrated in FIGS. 4(a) and 4(b), the mold clamping ram 66 is moved from its mechanical zero position toward its fully retracted position by the amount of X=6.56 mm, thereby suitably positioning the mold clamping ram 66 relative to the mold opening and closing cylinder 12 held in its mold closing position, assuring the engagement of the first and second engageable protrusions 86, 88 of the nut halves 80, 80 and the mold opening and closing cylinder 12.

In addition, the operation of the mold clamping apparatus constructed according to the present embodiment may be controlled by utilizing a pressure sensor 92 as shown in FIG. 2, for example. More specifically, the output torque of the first servomotor 22 is feedback controlled based on the hydraulic pressure force of the hydraulic chamber 40 and the mold clamping chamber 76 detected by the pressure sensor 92, resulting in improved accuracy of control of the operation of the apparatus.

Figure 5:
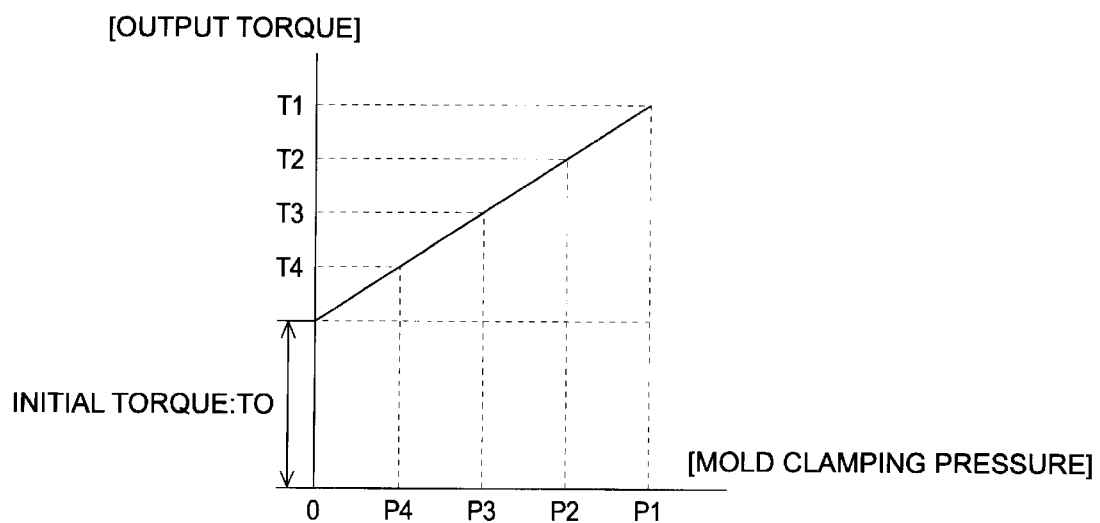
FIG. 5 is a graph showing a relationship between a mold clamping pressure and an output torque of a servomotor, based on which is controlled a mold clamping pressure of the mold clamping apparatus of FIG. 1.

Referring to FIG. 5, there is shown a graph showing a relationship between the output torque of the first servomotor 22 and the generated mold clamping pressure. As is apparent from FIG. 5, the output torque includes an initial output torque corresponding to a force resisting to the biasing force of the coil spring 46, in addition to an output torque corresponding to the hydraulic pressure force acting as the mold clamping force. This means that the mold clamping pressure is controlled taken into account the initial torque of the first servomotor 22.

Figure 6:
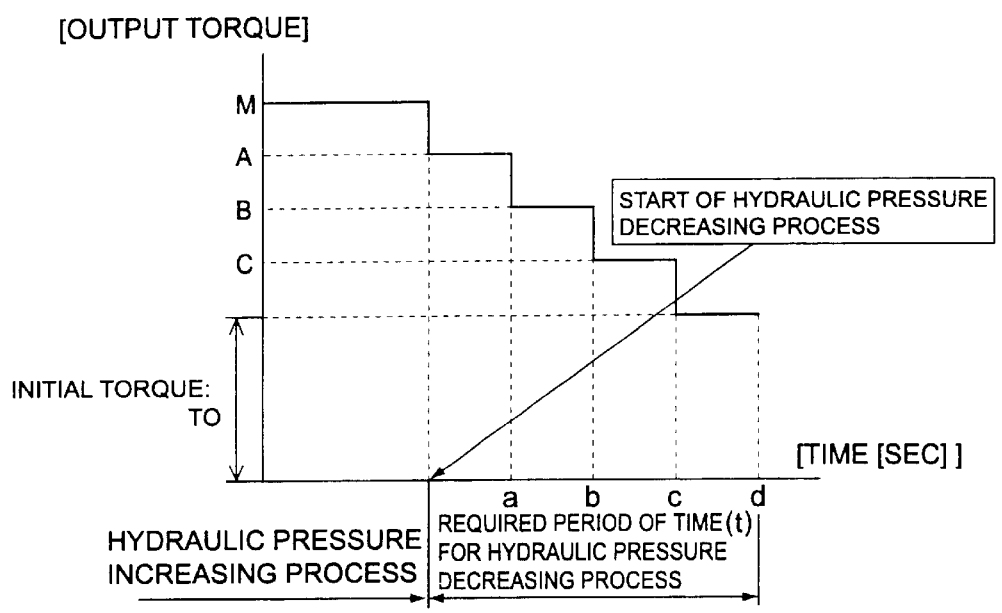
FIG. 6 is a graph showing a relationship between a mold clamping pressure and an output torque of a servomotor, based on which is controlled a mold clamping pressure decreasing operation of the mold clamping apparatus of FIG. 1.
Figure 7:
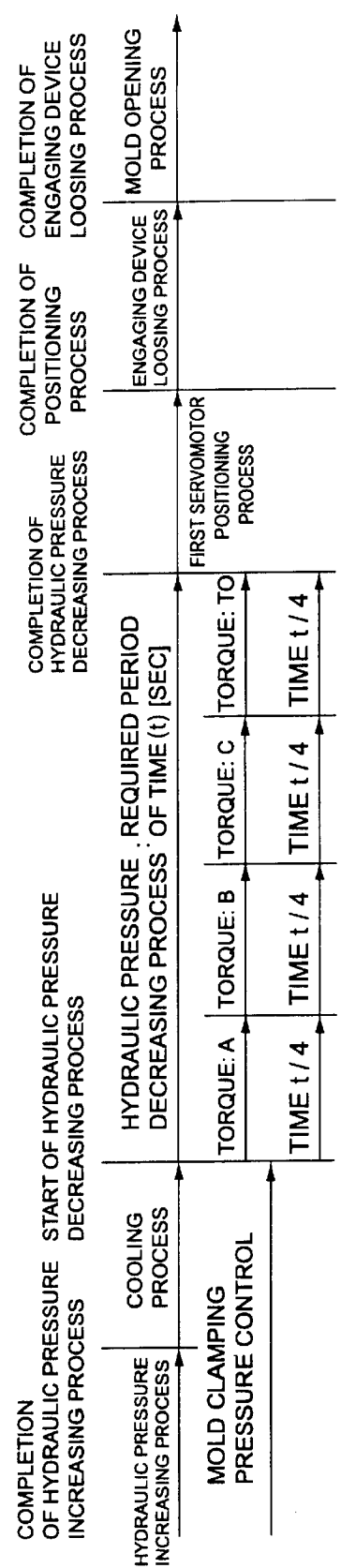
FIG. 7 is a time chart of the mold clamping pressure-decreasing operation of FIG. 6.

According to the operation of the mold clamping apparatus of the present embodiment, the mold clamping pressure is decreased after the injection-molding operation. The mold clamping pressure decreasing operation is executed by controlling the output torque of the first servomotor 22, thereby eliminating or moderating abrupt change of the hydraulic pressure in the mold clamping chamber 76 which may cause undesirable impact. For effectively decreasing the mold clamping pressure in the mold clamping chamber 76, the output torque of first servomotor 22 may preferably be controlled as follows: Namely, the value of the output torque of the first servomotor 22 is gradually decreased from a value: M which is generated in the mold clamping operation, to a value: T0 which is generated when the mold clamping pressure decreasing operation is completed, at a plurality number (N) of operation stages, within a predetermined period of time: (t). Referring to FIGS. 6 and 7, there are shown a graph showing a change of the output torque of the first servomotor 22 which is controlled by a four-stage control operation, and a time chart for illustrating the steps of the mold clamping operation of the present embodiment, wherein the output torque of the first servomotor 22 is controlled by the four-stage control operation, by way of example. In FIG. 7, an "first servomotor positioning process" is executed for placing the servomotor 22 in its neutral angular position, and an "engaging device loosing process" is executed for moving the nut halves 80, 80 remote from the mold opening and closing cylinder 12.

Alternatively, the first servomotor 22 may be controlled based on its rotating velocity, for decreasing the mold clamping pressure. Specifically, the first servomotor 22 is rotated in the reverse direction upon detection of the input signal indicative of the start of the mold clamping pressure decreasing operation. The rotating velocity (V) of the first servomotor 22 is controlled during a predetermined period of time: (t) which is require for decreasing the mold clamping pressure, thereby effectively decreasing the mold clamping pressure. It is desirable that the value (V) of the rotating velocity of the first servomotor 22, the number of control steps, and the period of time for each control step are made adjustable.

Figure 8:
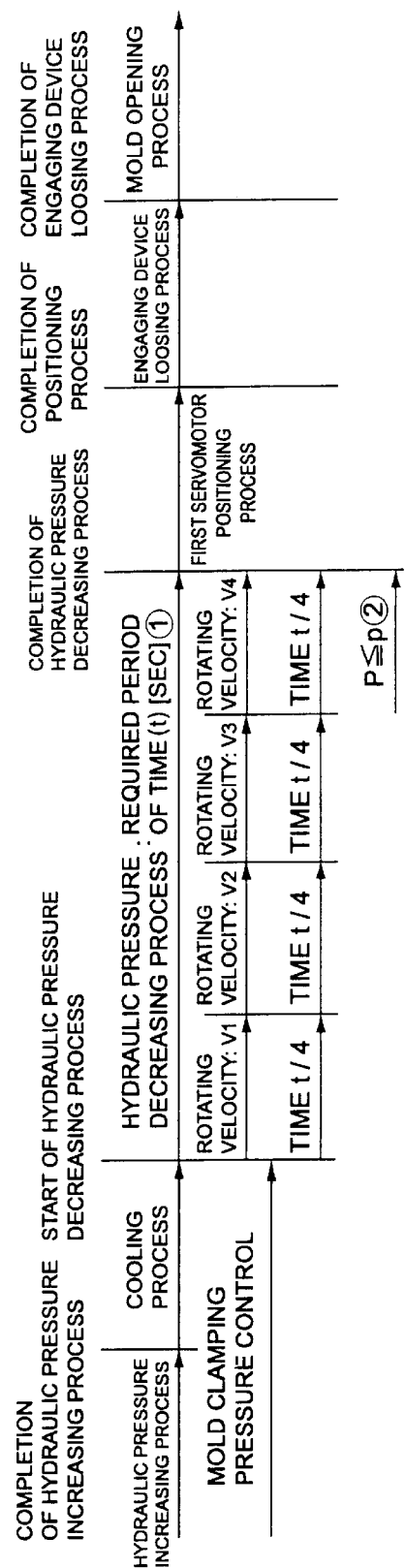
FIG. 8 is a time chart of another mold clamping pressure-decreasing operation of the mold clamping apparatus of FIG. 1, which is controlled based on a rotating velocity of the servomotor.

The mold clamping pressure decreasing operation may otherwise be arranged such that the mold clamping pressure decreasing process is immediately finished when the measurement value: P of the mold clamping pressure comes up to a predetermined value: p sufficient for finishing the mold clamping pressure decreasing operation, even if the predetermined period of time: t required for the mold clamping pressure decreasing operation has not yet passed. FIG. 8 is a time chart illustrating the control steps of mold clamping operation of the present embodiment, wherein the rotating velocity of the first servomotor 22 is controlled by a four-stage control operation, by way of example.

Figure 9:
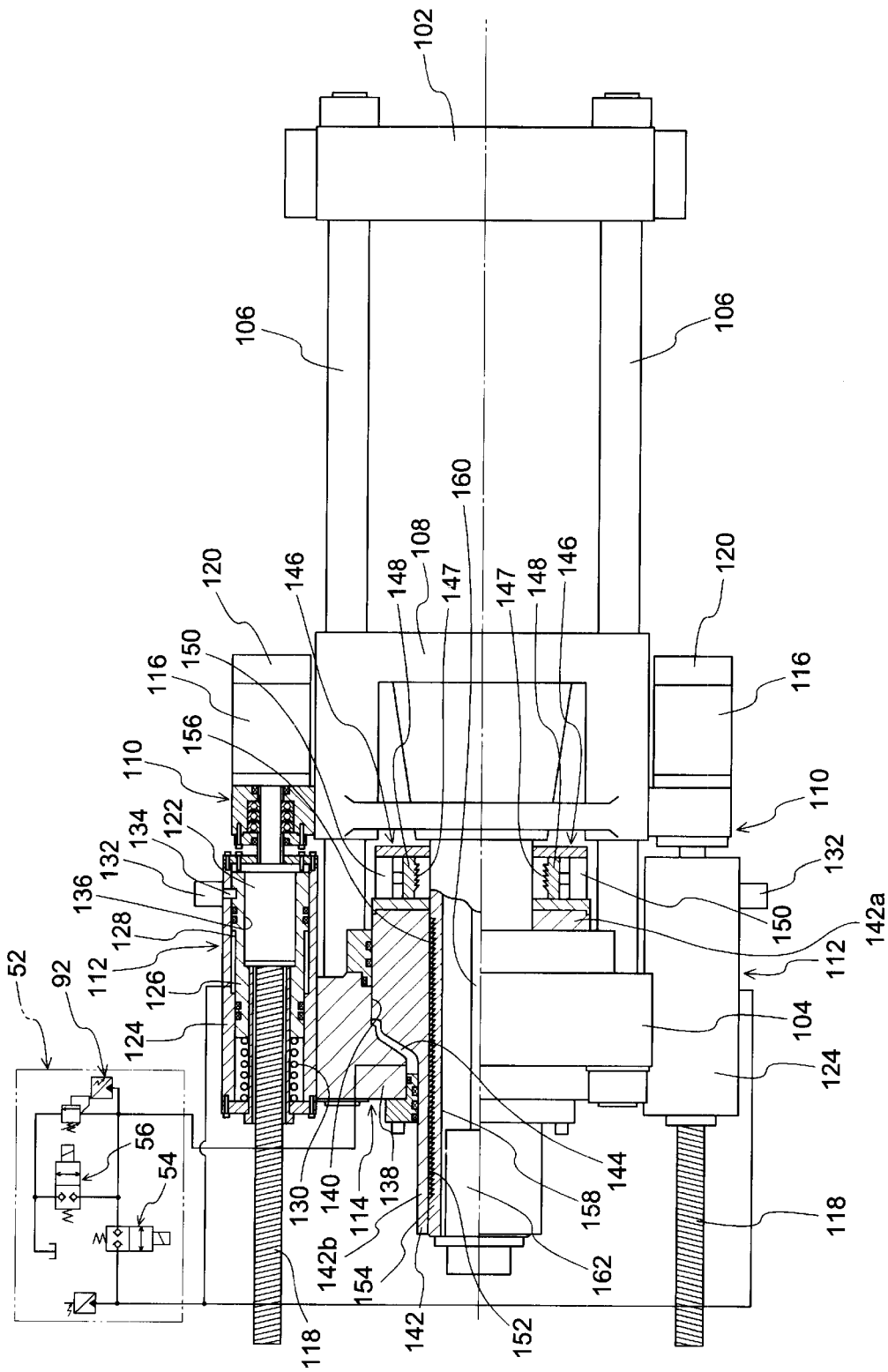
FIG. 9 is a partially cross sectional plane view of a mold clamping apparatus constructed according to another preferred embodiment of the invention.
Figure 10:
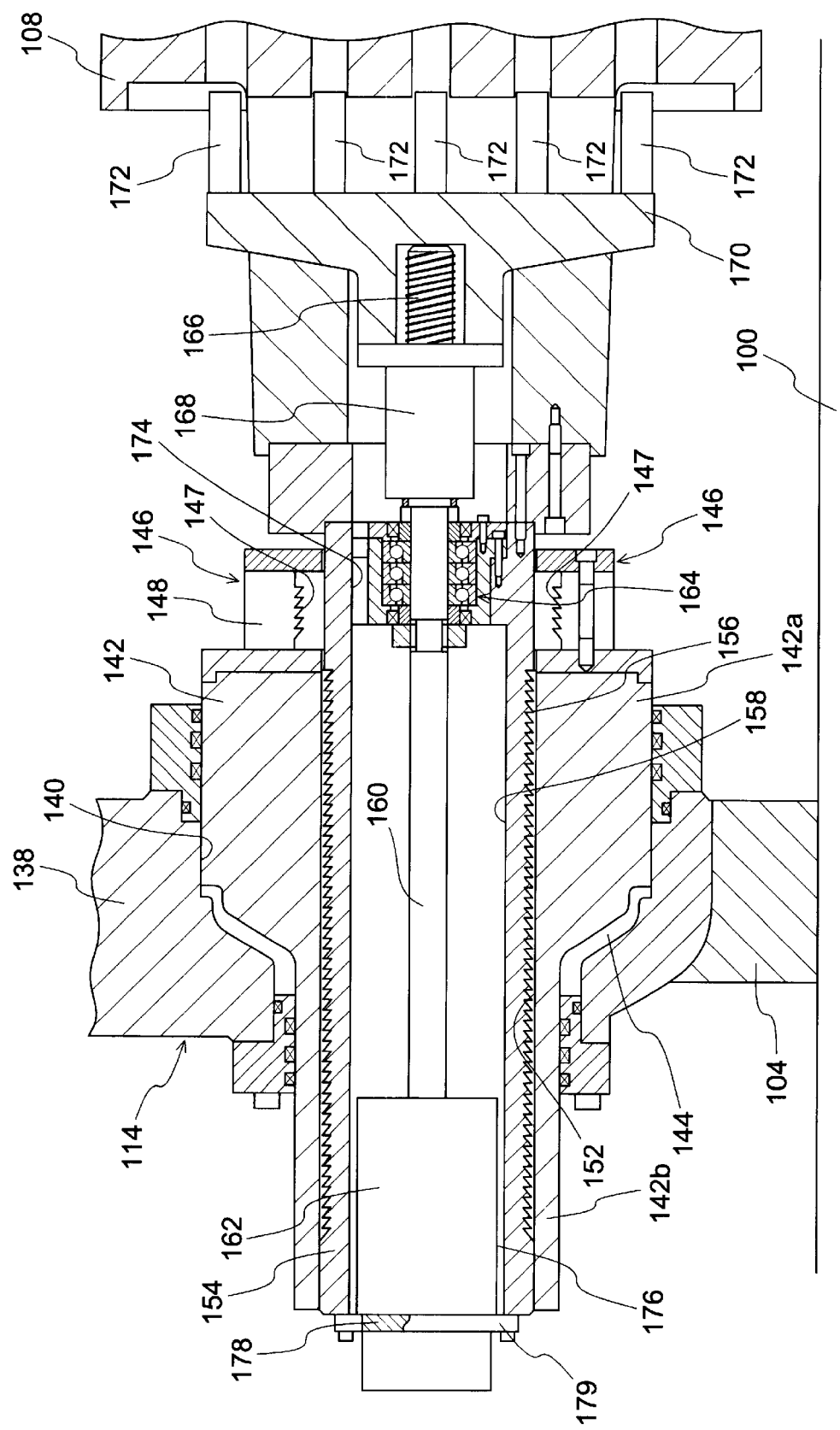
FIG. 10 is an enlarged fragmentary view of the mold clamping apparatus of FIG. 9.

Referring next to FIGS. 9 and 10, there is illustrated the mold clamping apparatus of the injection molding machine, which apparatus constructed according to the second embodiment of the present invention. The mold clamping apparatus includes a stationary and rear platens 102, 104 which are individually fixedly supported by a base 100 of the injection molding machine such that they are opposite to and remote from each other. Like the mold clamping apparatus of the first embodiment, four tie bars 106 extend parallel to each other over the stationary and rear platens 102, 104, and a movable platen 108 is supported by means of the four tie bars 106 so as to be movable along the tie bars 106 between the stationary platen 102 and the rear platen 104.

Between the rear and movable platens 104, 108, there is disposed a driving unit driven by an electric motor by which the movable platen 108 is moved toward and away from the stationary platen 102. To the stationary and movable platens 102, 108, there are respectively attached a stationary and movable mold halves of a mold (not shown). By the reciprocal movement of the movable platen 108, the movable mold half is moved toward the stationary mold half in order to close and clamp the mold, and is moved from the stationary mold half in order to open the mold.

There will be described a specific construction of the driving unit of electric-motor type of the present embodiment.

The driving device includes a pair of movable-platen-driving devices of screw-feed type 110, 110. The movable-platen-driving devices 110, 110 are disposed opposite to each other in a direction perpendicular to a center axis of the rear and movable platens 104, 108. Similarly, the pressure-generating cylinder devices 112, 112 are disposed opposite to each other in the same direction. The driving device further includes a mold clamping cylinder device 114 which is radially outwardly disposed of the center axis of the rear and movable platens 104, 108. In the driving device of the present embodiment, the movable-platen-driving devices 110, 110 are adapted to move the movable platen 108 toward and away from the stationary platen 102 at a relatively high velocity, while the pressure-generating cylinder devices 112, 112 and the mold clamping cylinder device 114 are adapted to apply a sufficiently large mold clamping force between the movable and stationary platens 108, 102.

Described more specifically, the movable-platen-driving devices 110, 110 include: first servomotors 116, 116 as a movable-platen-driving-electric motor, which are fixed to the horizontally opposite surfaces of the movable plate 108, respectively; and first ball-screw shafts 118, 118 which are disposed on the horizontally opposite sides of the rear platens 104 so as to extend parallel to a direction of movement of the movable platens 108, i.e., the center axis of the movable platen 108. Each of the first ball-screw shafts 118, 118 is supported at its advanced-hand axial end by the movable platen 108 such that the first ball-screw shaft 118 is rotatable about its axis and immovably in the axial direction. The first ball-screw shafts 118, 118 are fixed to the output shafts of the first servomotors 116, 116, respectively. Each of the first servomotors 116 has an encoder 120 for detecting an amount of rotation thereof.

Each movable-platen-driving device 110 further includes a first ball-nut 122 which is thread-engaged with the first ball-screw shaft 118 and located on the side of the rear platen. The first ball-nuts 122, 122 are respectively supported by the pressure-generating cylinder devices 112, 112 which are fixed to respective surfaces of the rear platen 104.

Each pressure-generating cylinder device 112 includes a cylindrical pressure-generating cylinder 124 and a pressure-generating piston 126 reciprocally movable within a bore of the pressure-generating cylinder 124. The outer circumferential surface of the pressure-generating piston 126 and the inner circumferential surface of the pressure-generating cylinder 124 cooperate to define therebetween a pressure chamber 128. The pressure-generating cylinder device 112 is arranged such that the movement of the pressure-generating piston 126 in a direction remote from the stationary platen 102 (toward the left-hand end of the cylinder 124 as seen in FIG. 9) decrease the volume of the pressure-generating chamber 128.

The pressure-generating cylinder device 112 further includes a coil spring 130 interposed between the pressure-generating cylinder 124 and piston 126. The coil spring 130 is adapted to apply a biasing force to the pressure-generating piston 126 so that the pressure-generating piston 126 is forcedly placed on the right-hand axial end of the cylinder 124 as seen in FIG. 9, in other words, is forcedly held in its retracted position, whereby the volume of the pressure-generating chamber 128 is made maximum. In order to hold the pressure-generating piston 126 in its retracted position with high stability, a lock cylinder 132 as a lock means is disposed on the pressure-generating cylinder 124. More specifically, the lock cylinder 132 includes a lock pin 134 reciprocally movable within a bore thereof. The lock pin 134 protrudes toward and is movable toward and away from the pressure-generating piston 126 through a through hole formed through an outer circumferential surface of the pressure-generating cylinder 124. Thus, the lock pin 134 is engaged with and disengaged from the pressure cylinder piston 126. With the lock pin 134 being engaged with the pressure-generating piston 126, the pressure generating piston 126 is held in its retracted position with high stability. It this respect, the lock cylinder 132 may preferably be constituted by an air cylinder.

The pressure generating piston 126 is a hollow cylindrical member having a bore 136 wherein the first ball-nut 122 is bolted. Thus, the first ball-screw shaft 118 is movably disposed within and extends through the bore 136 of the pressure generating piston 126 and a bore of the pressure generating cylinder 124.

With the lock cylinder 132 being engaged with the pressure-generating piston 126, the first servomotor 116 is operated to rotate the first ball-screw shaft 118. The rotation of the first ball-screw shaft 118 relative to the ball-nut 112 is converted into a longitudinal motion of the first ball-screw shaft 118 so that a driving force is applied between the rear and movable platens 104, 108 in the direction in which the two platens 104, 108 are opposite to each other. Accordingly, the movable platen 108 is moved toward and away from the stationary platen 102, for thereby opening and closing the mold therebetween.

With the lock cylinder 132 being disengaged from the pressure-generating piston 126, on the other hand, the servomotor 116 is operated to rotate the first ball-screw shaft 118 relative to the ball-nut 112. In this case, the driving force applied between the rear and movable platens 104, 108 causes the sliding movement of the pressure-generating piston 126 remote from its retracted position, to thereby decrease the volume of the pressure-generating chamber 128 for generating a hydraulic pressure therein. The generated hydraulic pressure in the pressure-generating chamber 128 is applied to the mold clamping cylinder device 114, thereby driving the mold clamping cylinder device 114 to apply the mold clamping force between the movable and stationary platens 108, 102.

The mold clamping cylinder device 114 is integrally formed with the rear platen 104, and includes a mold clamping cylinder 138 whose center axis is aligned with the center axis of the movable platen 108, and a mold clamping ram 142 slidably movable within a bore 140 of the mold clamping cylinder 138. The mold clamping ram 142 has a large-diameter portion 142a located adjacent to the movable platen 108 and a small-diameter portion 142b whose end portion is always projected from the bore of the mold clamping cylinder 138 in a direction remote from the movable platen 108. As in the mold clamping apparatus of the first embodiment, the mold clamping cylinder 138 and the mold clamping ram 142 are cooperate to define therebetween a mold clamping chamber 144.

Like the mold clamping apparatus of the first embodiment, an engaging device 146 is fixed to the end face of the large-diameter portion 142a of the mold clamping ram 142. The engaging device 146 includes a pair of nut halves 148, 148 which are opposite to each other in the diametric direction thereof and having inner circumferential surfaces formed with plurality of a first engageable protrusions 147 extending in its circumferential direction and being spaced apart from each other in its axial direction with constant intervals, and a pair of cylinder devices 150, 150 adapted to move the nut halves 148, 148 in the diametric direction. The mold clamping ram 142 has a bore 152 extending in its axial direction and open in the end faces of the large- and small-diameter portions 142a, 142b. A mechanical ram 154 is fixed at one of its axially-opposite end portions to one of axial end face of the movable platen 108, which is remote from the stationary platen 102, and extends in a direction remote from the stationary platen 102 through the bore 152.

Like the mold opening and closing cylinder 12 of the first embodiment, a mechanical ram 154 is a hollow cylindrical member and is positioned with respect to the movable platen 108 such that the center axis of the mechanical ram 154 is aligned with the straight line passing through the center of the movable platen 108. The mechanical ram 154 is formed with a plurality of second engageable annular protrusions 156 each having a serrated shape in cross section, which are arranged in the axial direction at regular intervals. The first engageable protrusions 147, 147 of the nut halves 148, 148 are engageable with the second engageable annular protrusions 156 of the mechanical ram 154. With the first and second engageable protrusions 147, 147, 156 being integrally and forcedly engaged with each other, the first servomotor 116 is operated to rotate the first ball-screw shaft 118 relative to the first ball-nut 122 for generating the advance movement of the pressure-generating piston 126 to increase the hydraulic pressure in the pressure-generating chamber 128. The generated hydraulic pressure in the pressure-generating chamber 128 is transmitted to the mold clamping chamber 144, whereby the mold clamping ram 142 is moved toward the movable platen 108 based on the increased hydraulic pressure in the mold clamping chamber 144. The advance movement of the mold clamping ram 142 is transmitted through the mechanical ram 154 to the movable platen 108, thereby applying the mold clamping force between the movable and stationary platens 108, 102.

With respect to the hydraulic unit 52 for controlling flow of the working fluid between the pressure-generating cylinder device 112 and the mold clamping cylinder device 114, as shown in FIG. 9, the reference numerals used in the first embodiment will be used to identify the corresponding elements, and no description of these elements will be provided.

As illustrated in FIG. 10, the mechanical ram 154 is also a hollow cylindrical member. Within a bore 158 of the mechanical ram 154, there is disposed an ejecting ball-screw shaft 160 as a second ball-screw shaft so as to extend therethrough. The ejecting ball-screw shaft 160 is supported at one of axially opposite ends, i.e., at the right-hand end by the mechanical ram 154 through a bearing 164 such that the ejecting ball-screw shaft 160 is rotatable about its axis, while being immovable in the axial direction. The ejecting screw shaft 160 further protrudes from the mechanical ram 154 toward the movable platen 108 with a given axial length. A protruding end 166 functions as a ball-screw shaft. An ejecting ball-nut 168 as a second ball-nut is thread-engaged with the protruding end 166, while being fixed to an ejector plate 170 incorporated into the movable platen 108. The ejector plate 170 has a suitable number of ejector pins 172 which are adapted to eject a molding product from the movable mold half, as well known in the art.

To the other or the left-hand axial end of the ejecting ball-screw shaft 160, on the other hand, the output shaft of an ejecting servomotor 162 as an ejecting electric motor, is fixedly connected so as not to be rotated relative to each other. Further, the ejecting servomotor 162 is disposed within the bore 158 of the mechanical ram 154 and bolted to the axial open end portion of the mechanical ram 154. The bore 158 of the mechanical ram 154 is open in its right-hand axial end to the atmosphere through a communication hole 174 formed through a base portion of the bearing 164, while being open in its left-hand axial end to the atmosphere through a void 176 formed between the outer circumferential surface of the ejecting servomotor 162 and the bore 158, and a hole 178 formed through a flange portion 179 of the ejecting servomotor 162. The provision of the communication hole 174, the void 176 and the hole 178 promotes ventilation of the bore 158, upon reciprocal movement of the mechanical ram 154.

The ejecting servomotor 162 is operated to rotate the ejecting ball-screw shaft 160 relative to the ejecting ball-nut 168, causing a rectilinear motion of the ejecting ball-nut 168 in the axial direction. By the rectilinear motion movement of the ejector pin 172 in the axial direction, the ejector plate 170 is moved toward and away from the movable platen 108, permitting an advancing and retracting movement of the ejector pin 172 in the axial direction.

Therefore, the mold clamping apparatus constructed according to the second embodiment is capable of exhibiting desired effects like the mold clamping apparatus of the first embodiment. That is, the mold clamping apparatus of the present invention permits a mold opening and closing action at a relatively high-velocity, owing to the rectilinear motion of the movable-platen-driving devices 110, 110 directly applied to the movable platen 108. Moreover, the mold clamping apparatus is capable of generating and applying a relatively-large mold clamping force to the movable platen based on a pressure increase action of the hydraulic device comprising the pressure-generating cylinder devices 112, 112 and the mold clamping cylinder device 114.

In the mold clamping apparatus of the second embodiment, the first ball-screw shaft 118 is directory connected to the output shaft of the servomotor 116. This arrangement permits a reduction in noise and an improved accuracy of a positioning control of the ball-screw shaft 118, in comparison with the case where the first ball-screw shaft and the output shaft of the servo motor is connected by means of a suitable transmission member such as a belt.

In addition, the mold clamping apparatus constructed according to the second embodiment, is arranged such that one movable plate driving device 110 and one pressure-generating cylinder device 112 are disposed on one side of the rear and movable platens 104, 108, while the other movable plate driving device 110 and the other pressure-generating cylinder device 112 are disposed on the other side of the rear and movable platens 104, 108. Further, the first servomotors 116, 116 are supported by the movable platen 108. In this arrangement, axial length of the mold clamping apparatus of the second embodiment, is made smaller than that of the mold clamping apparatus of the first embodiment, resulting in reduction in size of the mold claming apparatus of the second embodiment.

In the mold clamping apparatus of the second embodiment, the pressure-generating piston 126 of the pressure-generating cylinder device 112 is held in its retracted position, during the movable platen 108 is moved toward the stationary platen 102, by means of the lock pin 134 directly engaged with the outer circumferential surface of the pressure generating piston 126, in addition to the biasing force of the coil spring 130. This arrangement assures a further improved stability of the mold opening and closing action.

In the second embodiment, one movable-platen-driving device 110 and one pressure-generating cylinder device 112 are disposed on the one of opposite sides of the rear and movable platens 104, 108, while the other movable-platen-driving device 110 and the other pressure generating cylinder 112 are disposed on the other sides of the rear and movable platens 104, 108, so that the bore 158 of the mechanical ram 154 is effectively utilized for accommodating the electrically-operated ejector mechanism of ball-screw type. This arrangement permits that both of an electrification of the ejector mechanism and an efficient arrangement of the components of the apparatus, with improved space utilization.

Moreover, the interior space of the bore 158 of the mechanical ram 154 is open to the atmosphere through the communication hole 174 formed in one of opposite axial ends of the mechanical ram 154, and the void 176 and the hole 178 formed in the other axial end of the mechanical ram 154, thereby facilitating ventilation of the interior space of the mechanical ram 154, effectively preventing or reducing undesirable generation of heat in the servomotor 162 disposed within incorporated in the bore 158 of the mechanical ram 154.

Like the first embodiment, the mold clamping apparatus constructed according to the second embodiment may desirably includes the second servo motor 78 as the positioning electric motor so that the mold clamping ram 142 and the mold clamping cylinder 138 are suitably positioned relative to each other in the axial direction with high preciseness.

While the presently preferred embodiments of the present invention have been described above in detail for illustrative propose only, it is to be understood that the present invention is not limited to the details of the illustrated embodiment, but may be otherwise embodied with various other changes, modifications and improvements, which may occur to those skilled in the art, without departing from the spirit and scope of the invention.

What is claimed is:

1. A mold clamping apparatus of an injection-molding machine for clamping a mold consisting of a stationary mold half and a movable mold half, said mold clamping apparatus comprising:

a stationary platen fixedly disposed on a base of the injection-molding machine and being fixed with the stationary mold half;

a rear platen fixedly disposed on the base of the injection-molding machine and being opposite to and spaced apart from said stationary platen and;

a movable platen movably disposed between said stationary and rear platens and being fixed with the movable mold half;

an electrically-operated movable-platen-driving device of ball-screw type, including a first ball-screw shaft supported by one of said movable and rear platens, a first ball-nut threaded-engaged with said first ball-screw shaft and supported by the other of said movable and rear platens, and a movable-platen-driving-electric motor adapted to rotate said first ball-screw shaft and nut relative to each other so as to generate a relative longitudinal motion of said first ball-screw shaft and nut so that said movable platen is moved toward and away from said stationary platen to close and open the mold;

a pressure-generating cylinder device disposed on said rear platen and having a pressure-generating piston being moved by said relative longitudinal motion of said first ball-screw shaft and nut in order to generate a hydraulic pressure;

a mold clamping cylinder device disposed on said rear platen and adapted to generate a mold clamping force based on said hydraulic pressure generated in and applied from said pressure-generating cylinder device, said mold clamping cylinder device having a mold clamping ram being connectable to said movable platen for applying said mold clamping force to said movable platen; and an engaging device having a first operating position for connecting said mold clamping ram with said movable platen, and a second operating position for disconnecting said mold clamping ram from said movable platen;

said mold clamping apparatus clamping the mold such that said movable platen is moved toward said stationary platen to close the mold therebetween, and said pressure-generating cylinder is operated to generate said hydraulic pressure, based on said relative longitudinal motion of said first ball-screw shaft and nut, while said engaging device is placed in said first operating position in order to apply said mold clamping force generated in said mold clamping cylinder device to said movable platen.

2. A mold clamping apparatus according to claim 1, wherein said pressure-generating cylinder device further includes a biasing device adapted to bias said pressure-generating piston toward a fully retracted position thereof to increase a volume of a pressure-generating chamber of said pressure-generating cylinder device.

3. A mold clamping apparatus according to claim 1, wherein said pressure-generating cylinder device further includes a lock device which is operable to fixedly connect said pressure-generating piston to a pressure-generating cylinder of said pressure-generating cylinder device, so as to prevent a movement of said pressure-generating piston relative to said pressure-generating cylinder.

4. A mold clamping apparatus according to claim 1, further comprising a hydraulic device which includes a hydraulic circuit for fluid communication between a pressure-generating chamber of said pressure-generating cylinder device and a mold clamping chamber of said mold clamping cylinder device, and a switch valve for alternately connecting and disconnecting said pressure-generating chamber to and from said mold clamping chamber.

5. A mold clamping apparatus according to claim 1, wherein said pressure-generating piston is a hollow cylindrical member, said pressure-generating chamber being partially defined by an outer circumferential surface of said hollow pressure-generating piston, said first ball-screw shaft being located in and extending through a bore of said hollow pressure-generating piston, and said first ball-nut being fixed to said hollow pressure-generating piston.

6. A mold clamping apparatus according to claim 1, wherein said mold clamping cylinder device is disposed such that a center axis of said mold clamping cylinder device is aligned with a center axis of said movable platen, and said mold clamping ram comprises a hollow cylindrical member, said apparatus further comprising: a mechanical ram which is fixed at one of axially opposite ends thereof to said movable platen and partially located in a bore of said hollow mold clamping ram, said engaging device being operable to hold said hollow mold clamping ram in engagement with said mechanical ram.

7. A mold clamping apparatus according to claim 6, wherein said engaging device comprises a plurality of first engageable protrusions formed on an outer circumferential surface of said mechanical ram such that said first engageable protrusions extend in a circumferential direction of said mechanical ram and are spaced apart from each other at regular intervals in an axial direction of said mechanical ram, and an engaging member having a plurality of second engageable protrusions and supported by said mold clamping ram such that said engaging member is immovable in an axial direction of said mechanical ram and is movable toward and away from the outer circumferential surface of said mechanical ram, for engaging and disengaging said second engageable protrusions with and from said first engageable protrusions.

8. A mold clamping apparatus according to claim 7, further comprising a positioning electric motor adapted to move said engaging member relative to said mechanical ram in the axial direction of said mechanical ram so that said second engageable protrusions of said engaging member is suitably positioned for an engagement with said first engageable protrusions of said mechanical ram.

9. A mold clamping apparatus according to claim 6, wherein said mechanical ram comprises a hollow cylindrical member, said mold clamping apparatus further comprising: an electrically-operated ejector device of ball-screw type having an ejector fixed to said movable platen, a second ball-screw shaft located in a bore of said hollow mechanical ram and fixed to one of said mechanical ram and said ejector, an second ball-nut threaded-engaged with said second ball-screw shaft and fixed to the other of said mechanical ram and said ejector; and an ejecting electric motor adapted to rotate said second ball-screw shaft and nut relative to each other so as to generate a relative longitudinal motion of said second ball-screw shaft and nut, thereby driving said ejector.

10. A mold clamping apparatus according to claim 9, wherein said ejecting electric motor is fixedly disposed within said bore of said hollow mechanical ram, and said hollow mechanical ram having an air flow passage extending through said bore thereof.

11. A mold clamping apparatus according to claim 1, wherein said pressure-generating cylinder device comprises a plurality of pressure-generating cylinder devices disposed about a center axis of said movable platen.

12. A mold clamping apparatus according to claim 11, wherein each of said plurality of pressure-generating cylinder devices comprises: said pressure-generating piston in the form of a hollow cylinder; said pressure-generating chamber partially defined by an outer circumferential surface of said hollow pressure-generating piston; said first ball-screw shaft located in and extending through a bore of said hollow pressure-generating piston; said first ball-nut fixed to said hollow pressure-generating piston; and said movable-platen-driving-electric motor being fixedly supported by said movable platen and being adapted to rotate said first ball-screw shaft and nut relative to each other.

13. A mold clamping apparatus according to claim 6, wherein said mechanical ram comprises a hollow mechanical ram and said first ball-screw shaft is located in a bore of said hollow mechanical ram.

14. A mold clamping apparatus according to claim 13, wherein said first ball-screw shaft is axially immovably supported by the base of the injection-molding machine, said pressure-generating piston being slidably movable within said bore of said mechanical ram so as to constitute said pressure-generating cylinder device, and said first ball-nut is fixed to said pressure-generating piston.

15. A mold clamping apparatus according to claim 1, wherein said apparatus comprising:
said first ball-screw shaft of said movable-platen-driving device supported by said base of the injection-molding machine such that said screw shaft is rotatable about an axis thereof and is immovable in an axial direction thereof;
said movable-platen-driving-electric motor adapted to rotate said first ball-screw shaft in forward and reversed directions;

a hollow mechanical ram radially outwardly disposed of said first ball-screw shaft and fixed at one of axially opposite ends thereof to said movable platen such that said hollow mechanical ram is movable in an axial direction thereof relative to the base of the injection-molding machine and is not rotatable about the axis thereof;

said pressure-generating piston radially inwardly disposed of said mechanical ram such that said pressure-generating piston is reciprocally slidably movable in an axial direction of said mechanical ram and is not rotatable about an axis of said mechanical ram, said pressure-generating piston cooperating with said mechanical ram to define a pressure-generating chamber therebetween whose volume is decreased by a movement of said pressure-generating piston toward one of axially opposite ends of said mechanical ram, said pressure-generating piston and said pressure-generating chamber cooperating with each other to constitute said pressure-generating cylinder device;

a biasing device adapted to bias said pressure-generating piston of said pressure-generating cylinder device relative to said mechanical ram such that said pressure-generating piston is biased toward one of axial ends of the pressure-generating cylinder remote from said movable platen;

said first ball-nut of said movable-platen-driving device, threaded engaged with said first ball-screw shaft and fixed to said pressure-generating piston of said pressure-generating cylinder device, said first ball-screw shaft and nut being rotated relative to each other so as to reciprocally move said pressure-generating piston;

said mold clamping cylinder radially outwardly disposed of said mechanical ram and fixedly supported by the base of the injection-molding machine;

said mold clamping ram of said mold clamping cylinder device radially outwardly disposed of said mechanical ram and radially inwardly of said mold clamping cylinder such that said ram being slidably movable in an axial direction of said mold clamping cylinder, said mold clamping ram cooperating with said mold clamping cylinder to define therebetween a mold clamping chamber;

a positioning electric motor adapted to move said mold clamping ram relative to said mold clamping cylinder for positioning said mold clamping ram relative to said mold clamping cylinder in the axial direction of said mold clamping cylinder;

a hydraulic device having a hydraulic circuit for fluid communication between said pressure-generating chamber of said pressure-generating cylinder device and said mold clamping chamber of said mold clamping cylinder device, and having a switch valve alternately connecting and disconnecting said pressure-generating chamber to and from said mold clamping chamber, so that said hydraulic pressure generated in said pressure-generating chamber is transmitted to said mold clamping chamber so as to generate a hydraulic pressure in said mold clamping chamber and apply the hydraulic pressure to said mold clamping ram as a hydraulic driving force, when said pressure-generating chamber and said mold clamping chamber are communicate with each other, and that said hydraulic pressure generated in said pressure-generating chamber is not transmitted to said mold clamping chamber so as to move said piston of said pressure-generating cylinder device together with said mechanical ram by rotating said first screw-shaft, thereby opening and closing the mold, when said pressure-generating chamber and said mold clamping chamber are disconnected from each other;

an engaging device disposed between said mold clamping ram of said mold clamping cylinder device and said mechanical ram, and being operable for engaging said mold clamping ram and said mechanical ram with each other in order to apply said hydraulic driving force applied to said mold clamping ram of said mold clamping cylinder device to said mechanical ram as a mold clamping force.

16. A mold clamping apparatus according to claim 1, wherein said apparatus comprising:

a plurality of said pressure-generating cylinder device including a plurality of pressure-generating cylinders fixed to said rear platen and disposed about an extension of a center axis of said movable platen so as to extend parallel to said center axis of said movable platen, a plurality of said pressure-generating pistons each having a hollow cylindrical shape, and being slidably movable within said plurality of pressure-generating cylinders, respectively, and a plurality of said pressure-generating chambers partially defined by outer circumferential surfaces of said hollow pressure-generating pistons, and having a volume which is decreased by a sliding movement of said plurality of said pressure-generating pistons in a direction remote from said movable platen;

a plurality of said movable-platen-driving-electric motors disposed on said movable platen and adapted to respectively rotate said first ball-screw shafts in forward and reversed direction;

a plurality of said first ball-nuts thread-engaged with said plurality of said first ball-screw shaft and fixed to said plurality of pressure-generating pistons, respectively;

a plurality of biasing devices adapted to bias said pressure-generating pistons of said pressure-generating cylinder devices toward said movable platen in an axial direction;

said mold clamping cylinder device including said mold clamping cylinder fixedly disposed on said rear platen such that a center axis of said mold clamping cylinder is aligned with said center axis of said movable platen, said mold clamping ram having a hollow cylindrical shape being slidably movable within said mold clamping cylinder, and said mold clamping chamber partially defined by an outer circumferential surface of said mold claming ram and having a volume which is decreased by a sliding movement of said mold clamping ram in a direction remote from said movable platen;

a hydraulic device being operable to prohibit a fluid communication between said pressure-generating chambers and said mold clamping chamber for fixedly positioning said pressure-generating pistons relative to said pressure-generating cylinders, so that said movable platen fixed with said pressure-generating cylinders is moved toward and away from said stationary platen for closing and opening the mold, while being operable to allow a fluid communication between said pressure-generating chambers and said mold clamping chamber for a slidably movement of said pressure-generating piston, so that hydraulic pressure generated in said pressure-generating chamber by the rotation of said first ball-screw shaft is applied to said mold clamping chamber of said mold clamping cylinder device, thereby applying a hydraulic driving force to said mold clamping ram;

a mechanical ram fixedly disposed on said movable platen so as to extends toward said rear platen along said center axis of said movable platen;

said engaging device disposed between said mechanical ram and said mold claming cylinder device, and being operable to engage said mechanical ram and said mold claming ram relative to each other for applying said hydraulic driving force generated by said mold clamping cylinder device to said mechanical ram as said mold clamping force; and an electrically-operated ejector device of ball-screw type including an ejector plate fixed to said movable plate, a second ball-screw shaft located in a bore of said hollow mechanical ram and fixed to one of said mechanical ram and said ejector, an second ball-nut threaded-engaged with said second ball-screw shaft and fixed to the other of said mechanical ram and said ejector; and an ejecting electric motor adapted to rotate said second ball-screw shaft and nut relative to each other so as to generate a relative longitudinal motion of said second ball-screw shaft and nut, thereby driving said ejector.

17. A method of controlling an operation of a mold clamping apparatus as defined in claim 1, wherein said apparatus further includes a plurality of first engageable protrusions formed on one of said mold clamping ram and said movable platen such that said plurality of first engageable protrusions are spaced apart from each other at regular intervals in a direction in which said mold clamping ram and said movable platen are moved relative to each other, and an engaging member formed on the other of said mold clamping ram and said movable platen and having a plurality of second engageable protrusions which are engageable with said first engageable protrusions, said engaging member being moved toward and away from said first engageable member, said method comprising the steps of:

fixing a sample mold consisting of a movable mold half and a stationary mold half to said movable and stationary platens, respectively, said sample mold having a thickness smaller than that of a employed mold to be fixed;

moving said movable platen to a mold closing position thereof where said stationary and movable mold halves are held in contact with each other to close the sample mold between said stationary and movable platens;

detecting an axial position of said movable platen which is placed in said mold closing position, as an initial position of said movable platen in the axial direction;

adjusting an axial position of said mold clamping ram relative to said mold clamping cylinder in order to assure an engagement of said first and second engageable protrusions;

detecting an adjusted axial position of said mold clamping ram as an reference position of said mold clamping ram in the axial direction; and adjusting an relative position of said mold clamping ram and said mold clamping cylinder in the axial direction, based on detected data with respect to said initial position of said movable platen, and said reference position of said mold clamping ram, in order to assure said engagement of said first and second engageable protrusions, when said movable platen is held in the mold closing position to close an optional mold interposed between said movable and stationary platens.

18. A method of controlling an operation of a mold clamping apparatus as defined in claim 1, wherein said movable-platen-driving-electric motor comprises an electric servomotor, said method further comprising the steps of:

controlling an output torque of said electric servomotor, based on a hydraulic pressure in said pressure-generating chamber of said pressure-generating cylinder device, during said mold clamping apparatus clamp the mold.

19. A method of controlling an operation of a mold clamping apparatus as defined in claim 1, wherein said movable-platen-driving-electric motor, which is adapted to rotate said first ball-screw shaft of said movable-platen-driving device, comprises an electric servomotor, said method further comprising the steps of:

decreasing a hydraulic pressure in said mold clamping chamber by gradually decreasing a value of an output torque of said servomotor to a predetermined value so that a decrease of a hydraulic pressure in said mold clamping chamber is completed.

20. A method of controlling an operation of a mold clamping apparatus as defined in claim 1, wherein said movable-platen-driving-electric motor comprises an electric servomotor, said method further comprising the steps of:

decreasing a hydraulic pressure in said mold clamping chamber by changing gradually or continuously a rotation speed of said servomotor in a direction for generation a reduction of said hydraulic pressure in said mold clamping chamber, until is detected at least one of conditions: that a predetermined period of time has passed which is required for decreasing said pressure in said mold clamping chamber, and that said pressure in said mold clamping chamber has been reduced to a predetermined level.

21. A method of controlling an operation of a mold clamping apparatus, according to claim 17, wherein said mold clamping apparatus further includes a biasing device adapted to bias said pressure-generating piston toward a fully retracted position thereof to increase a volume of a pressure-generating chamber of said pressure-generating cylinder device, said method further comprising the steps of:

controlling an output torque of said servomotor taken into account of a force required for moving said pressure-generating piston against said biasing force of said biasing device applied thereto.

22. A method of controlling an operation of a mold clamping apparatus, according to claim 18, wherein said mold clamping apparatus further includes a biasing device adapted to bias said pressure-generating piston toward a fully retracted position thereof to increase a volume of a pressure-generating chamber of said pressure-generating cylinder device, said method further comprising the steps of:

controlling an output torque of said servomotor taken into account of a force required for moving said pressure-generating piston against said biasing force of said biasing device applied thereto.

23. A method of controlling an operation of a mold clamping apparatus, according to claim 19, wherein said mold clamping apparatus further includes a biasing device adapted to bias said pressure-generating piston toward a fully retracted position thereof to increase a volume of a pressure-generating chamber of said pressure-generating cylinder device, said method further comprising the steps of:

controlling an output torque of said servomotor taken into account of a force required for moving said pressure-generating piston against said biasing force of said biasing device applied thereto.

24. A method of controlling an operation of a mold claming apparatus according to claim 20, wherein said mold clamping apparatus further includes a biasing device adapted to bias said pressure-generating piston toward a fully retracted piston thereof to increase volume of a pressure-generating chamber of said pressure-generating cylinder device, said method further comprising the steps of:

controlling an output torque of said servomotor taken into account of a force required for moving said pressure-generating piston against said biasing force of said biasing device applied thereto.

25. A mold clamping apparatus according to claim 7, wherein said hollow mold clamping ram of said mold clamping cylinder device has an operational stroke length which is made larger than a sum of a pitch of the first engageable protrusions and an increased amount of the axial distance between said rear and movable platens upon application of a mold clamping force between said rear and movable platens.

26. A method of controlling an operation of a mold clamping apparatus according to claim 17, further comprising the step of:

adjusting said axial position of said mold clamping ram relative to said mold clamping cylinder in said axial direction such that said first and second engageable protrusions are engaged with each other at an engaging portion which is retracted from a fully advanced position of said mole clamping ram at least by an axial distance corresponding to an increased axial distance between said rear and movable platens due to an application of a mold clamping force between said rear and movable platens, and which is nearest to a mold-closing position of said mold clamping ram in the case where said employed mold is fixed.

27. A method of controlling an operation of a mold clamping apparatus according to claim 17, further comprising the steps of:

calculating a mold-thickness difference between said sample mold and said employed mold;

obtaining mold-closing position of said mold clamping ram when said movable platen is fixed with said employed mold, based on said mold-thickness difference and said initial position of said movable platen;

obtaining distance between the obtained mold-closing position and said reference position of said mold clamping ram of said mold clamping cylinder device; and obtaining an adjusting amount of said axial position of said mold clamping ram relative to the mold clamping cylinder of said mold clamping cylinder device required for ensuring engagement of said first and second engageable protrusions, based on the obtained distance of a pitch of said first engageable protrusions.

28. A mold clamping apparatus according to claim 1, wherein said apparatus comprising:

said first ball-screw shaft of said mold opening and closing mechanism supported by said base of the injection-molding machine such that said first ball-screw shaft is rotatable about an axis thereof and is immovable in an axial direction thereof;

said movable-platen-driving electric motor adapted to rotate said first ball-screw shaft in forward and reverse directions;

a hollow mechanical ram radially outwardly disposed of said first ball-screw shaft and fixed at one of axially opposite ends thereof to said movable platen, such that said hollow mechanical ram is movable in an axial direction thereof relative to the base of the injection-molding machine and is not rotatable about the axis thereof;

said pressure-generating piston radially inwardly disposed of said mechanical ram such that said pressure-generating piston is reciprocally slidably movable in an axial direction of said mechanical ram and is not rotatable about an axis of said mechanical ram, said pressure-generating piston cooperating with said mechanical ram to define a pressure-generating chamber therebetween whose volume is decreased by a movement of said pressure-generating piston toward one of axially opposite ends of said mechanical ram, said pressure-generating piston and said pressure-generating chamber cooperating with each other to constitute said pressure-generating cylinder device;

a biasing device adapted to bias said pressure-generating piston of said pressure-generating cylinder device relative to said mechanical ram such that said pressure-generating piston is biased toward one of axial ends of the pressure-generating cylinder remote from said movable platen;

said first ball-nut of said movable-platen-driving device threaded engaged with said first ball-screw shaft and fixed to said pressure-generating piston of pressure-generating cylinder device, said first ball-screw shaft and nut being rotated relative to each other so as to reciprocally move said pressure-generating piston;

said mold clamping cylinder radially outwardly disposed of said mechanical ram and fixedly supported by the base of the injection-molding machine;

said mold clamping ram of said mold clamping cylinder device radially outwardly disposed of said mechanical ram and radially inwardly of said mold clamping cylinder such that said mold clamping ram is slidably movable in an axial direction of said mold clamping cylinder, said mold clamping ram cooperating with said mold clamping cylinder to define therebetween a mold clamping chamber;

a positioning electric motor adapted to move said mold clamping ram relative to said mold clamping cylinder for positioning said mold clamping ram relative to said mold clamping cylinder in the axial direction of said mold clamping cylinder;

a hydraulic device having a hydraulic circuit for fluid communication between said pressure-generating chamber of said pressure-generating cylinder device and said mold clamping chamber of said mold clamping cylinder device, and permitting that said hydraulic pressure generated in said pressure-generating chamber by said relative longitudinal motion of said first ball-screw shaft and nut due to a rotation of said first ball-screw shaft is transmitted to said mold clamping chamber so as to generate a hydraulic pressure in said mold clamping chamber and apply the hydraulic pressure to said mold clamping ram as a hydraulic driving force;

an engaging device disposed between said mold clamping ram of said mold clamping cylinder device and said mechanical ram, and being operable for engaging said mold clamping ram and said mechanical ram with each other in order to apply said hydraulic driving force applied to said mold clamping ram of said mold clamping cylinder device to said mechanical ram as a mold clamping force.

29. A mold clamping apparatus according to claim 1, wherein said apparatus comprising:
- a plurality of said pressure-generating cylinder devices including a plurality of pressure-generating cylinders fixed to said rear platen and disposed about an extension of a center axis of said movable platen so as to extend parallel to said center axis of said movable platen, a plurality of said pressure-generating pistons each having a hollow cylindrical shape, and being slidably movable within said plurality of pressure-generating cylinders, respectively, and a plurality of said pressure-generating chambers partially defined by outer circumferential surfaces of said hollow pressure-generating pistons, and having a volume which is decreased by a sliding movement of said plurality of said pressure-generating pistons in a direction remote from said movable platen;
- a plurality of said first ball-screw shafts disposed about said center axis of said movable platen so as to extend parallel to said center axis and so as to be located in and extend through bores of said plurality of pressure-generating pistons, respectively, said plurality of said first ball-screw shafts axially immovably fixed to said movable platen;
- a plurality of said movable-platen-driving electric motors disposed on said movable platen and adapted to respectively rotate said first ball-screw shafts in forward and reversed directions;
- a plurality of said first ball-nuts fixed to said plurality of pressure-generating pistons and thread-engaged cylinder devices toward said movable platen in an axial direction, respectively;
- said mold clamping cylinder device including said mold clamping cylinder fixedly disposed on said rear platen such that a center axis of said mold clamping cylinder is aligned with said center axis of said movable platen, said mold clamping ram having a hollow cylindrical shape being slidably movable within said mold clamping cylinder, and said mold clamping chamber partially defined by an outer circumferential surface of said mold clamping ram and having a volume which is decreased by a sliding movement of said mold clamping ram in a direction remote from said movable platen;
- a hydraulic device being operable to prohibit a fluid communication to said pressure-generating chambers for fixedly positioning said pressure-generating pistons relative to said pressure-generating cylinders, so that said movable platen is moved by a rotation of said first ball-screw shaft relative to said rear platen fixed with said pressure-generating cylinders for closing and opening the mold, while being operable to allow a fluid communication between said pressure-generating chambers and said mold clamping chamber for permitting slidably movement of said pressure-generating pistons, so that hydraulic pressure generated in said pressure-generating chambers by the rotation of said first ball-screw shafts are applied to said mold clamping chamber of said mold clamping cylinder device, thereby applying a hydraulic driving force to said mold clamping ram;
- a mechanical ram fixedly disposed on said movable platen so as to protrude toward said rear platen along said center axis of said movable platen, said mechanical ram extending through a bore of said mold clamping ram of said mold clamping cylinder device;
- said engaging device disposed between said mechanical ram and said mold clamping ram of said mold clamping cylinder device, and being operable to engage to said mechanical ram and said mold clamping ram relative to each other for applying said hydraulic driving force generated by said mold clamping cylinder device to said mechanical ram as said mold clamping force; and
- an electrically-operated ejector device of ball-screw type including an ejector plate fixed to said movable plate, a second ball-screw shaft located in a bore of said hollow mechanical ram and fixed to one of said mechanical ram and said ejector, and second ball-nut threaded-engaged with said second ball-screw shaft and fixed to the other of said mechanical ram and said ejector; and an ejecting electric motor adapted to rotate said second ball-screw shaft and nut relative to each other so as to generate a relative longitudinal motion of said second ball-screw shaft and nut, thereby driving said ejector.

* * * * *